Figure 1A:
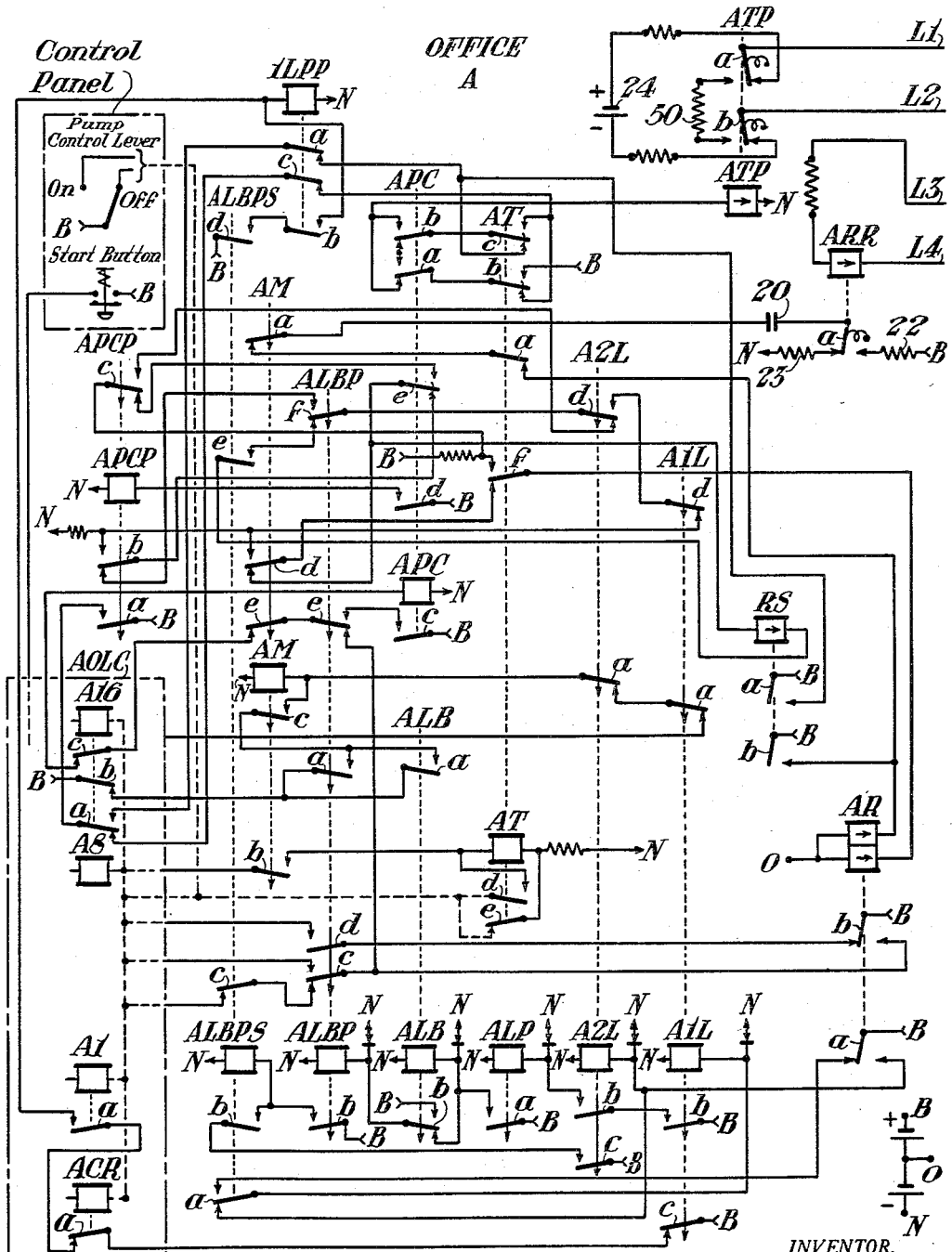

Counting Chain-Pyramid-Station Selection-and Starting Circuits.

INVENTOR.
David G. Emmel

Aug. 19, 1958   D. G. EMMEL   2,848,707
REMOTE CONTROL SYSTEMS
Filed Jan. 24, 1956   6 Sheets-Sheet 2

INVENTOR.
David G. Emmel
BY N. L. Stout
HIS ATTORNEY

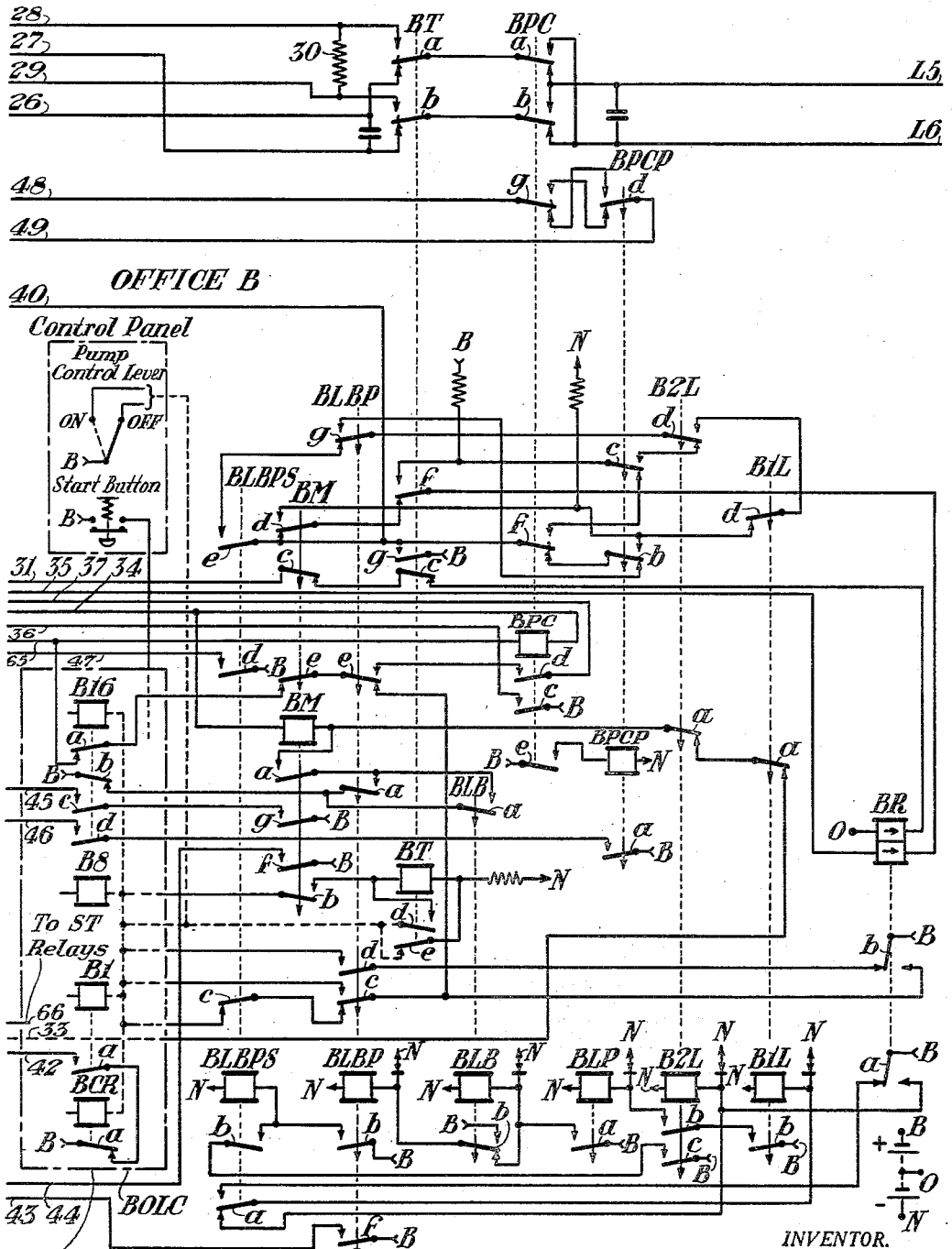

Aug. 19, 1958 — D. G. EMMEL — 2,848,707
REMOTE CONTROL SYSTEMS
Filed Jan. 24, 1956 — 6 Sheets-Sheet 5

INVENTOR.
David G. Emmel
BY W. L. Stout
HIS ATTORNEY

Counting Chain-Pyramid-Station Selection- and Starting Circuits.

United States Patent Office 2,848,707
Patented Aug. 19, 1958

2,848,707

REMOTE CONTROL SYSTEMS

David G. Emmel, Mount Lebanon, Pa., assignor to Westinghouse Air Brake Company, Wilmerding, Pa., a corporation of Pennsylvania Application January 24, 1956, Serial No. 561,100

12 Claims. (Cl. 340—163)

My invention relates to a remote control system and more particularly to a remote control system in which two control locations may be provided.

My invention is an improvement on the systems shown in any one of the Letters Patent of the United States No. 2,411,375 and No. 2,442,603, issued November 19, 1946, and June 1, 1948, respectively, to A. P. Jackel, and No. 2,698,425, issued December 28, 1954, to A. B. Miller, each for a Remote Control System. The general system of my invention is thus of the time code type employing codes of long and short elements which are transmitted one at a time over a communication channel.

Such remote control systems have been used extensively in the past to provide centralized traffic control for railroads. These systems are now being adapted to other uses, for example, the control of pumping and diversion stations along a pipeline. It has been found in this latter use that some modifications are occasionally necessary. As an example, in the control of the stations for certain pipelines, due to special requirements of the system, it is necessary that more than one control or office location be provided, with the second control location occasionally assuming control of the operations.

The use of two control points creates certain special problems which must be solved. For example, additional synchronizing of the coding action on the communication channel is necessary, especially in order to avoid simultaneous codes. The general systems of this type inherently synchronize between simultaneous control and indication codes when only one control office is used. With a second control office, however, the inherent ability of the system to lock out the stations is not sufficient. The secondary control location must also be locked out when the first or master control location is transmitting. In fact, the second control location should normally be in a partially locked out condition. That is, it should not be allowed to transmit control codes except as required under special conditions and situations. Under all conditions, the master control station must be able to transmit control codes, especially those of an emergency nature. It has been found desirable to accomplish most of this synchronizing action by having both of the office coding units follow all codes, even the control codes from the other office. This keeps the office coding unit not transmitting a code busy so that no attempt can be made to initiate a code of its own. However, since it is also desirable that indications from the stations be recorded at both control locations, special precautions must be taken to prevent a control code transmitted from one office location from being incorrectly recorded at the other office as an indication code. This is best accomplished by locking out the recording circuits during control codes.

Accordingly, an object of my invention is to provide a remote control system of the general type described having two control locations.

Another object of my invention is to provide in a remote control system a secondary control location which normally passes on the control codes from the master location but which may at times transmit controls to the stations.

Still another object of my invention is to provide, in a remote control system having two control locations, synchronizing means to prevent simultaneous coding from both control locations.

A further object of my invention is to provide, in a remote control system having two control locations, synchronizing means which will synchronize all coding action, control and indication, and maintain an orderly operation of the system by separating codes which may start simultaneously.

Again an object of my invention is to provide, in a remote control system as described, means to assure that all locations are locked out during the coding action except the one location producing the code.

Another object of my invention is to assure, in such a remote control system, that the master office records all indication codes, but that the control codes transmitted by the second office are not recorded as indications by the master location.

A further object of my invention is to assure that the master control location in such a remote control system can take control at any time except during the actual transmission of a code from another location.

Other objects and features of my invention will become apparent from the following description and from the appended claims.

In practicing my invention I provide a remote control system of the time code type generally as shown in any of the previously mentioned Patent Nos. 2,411,375, 2,442,603, or 2,698,425. However, it is to be understood that any other well-known type of remote control system of the time code type may be used. A communication channel is provided between the various office and station locations in the system. In addition to the usual control office, there is provided a secondary control or office location. Generally, this second office is between the first or master control office and the various stations of the system. This secondary office is then interposed in the communication channel extending from the master location to the various stations. It is to be understood that the principles of my invention may also be applied to other arrangements where the secondary control location is not between the master office and the stations. The second office is provided with coding apparatus similar to that at the master location including the coding unit control levers and the various other items that are necessary to control the apparatus at the stations.

However, at this second control office, an additional selective circuit arrangement is necessary to provide the necessary synchronizing of the coding action on the whole system. A manually selective control lever is provided so that the operator at the second office may, when directed, assume control of the stations beyond his location. Since it is planned that normally the master office location will have complete control, the selective circuit arrangement at the second location is designed to repeat and pass on the control codes from the master location to the stations. Provision is also made for keeping the coding equipment at the second location active during such codes. The second office also passes on to the master office all indication codes from the stations. However, the second office as well as the first or master office receives all indication codes and records them in the control apparatus. This selective circuit arrangement also includes a repeater relay which indicates when the master location is transmitting a code in order to prevent the transmission of a control code by the second location during this period under any circumstances. Furthermore, contacts of the relays included in these selective circuit arrangements are interposed in the usual line circuit connections between the secondary control office and the station locations to synchronize all of the coding operation. Finally, at the master office, a repeater relay is provided, in addition to the normal equipment, which repeats a long first step of the coding action in order to prevent the registration as indication codes of control codes transmitted from the second office and to prevent interruption of these second office control codes by reset pulses from the first office. This is necessary since, in the process of synchronization of the coding operation, during the period of time that the second office location has control, the coding equipment at the master office is made to follow all coding action in order to keep it occupied.

Two forms of apparatus embodying the features of my invention will now be described and the novel features thereof will then be pointed out in the appended claims.

Referring now to the drawings, Figs. 1a, 1b, 1c, and 1d, when taken together in the order named with Fig. 1a to the left, show in condensed form the apparatus embodying my invention when a duplex communication channel is provided between the two office locations. The secondary office is located between the master office and the station locations which are to be controlled from either location.

Figure 1D:
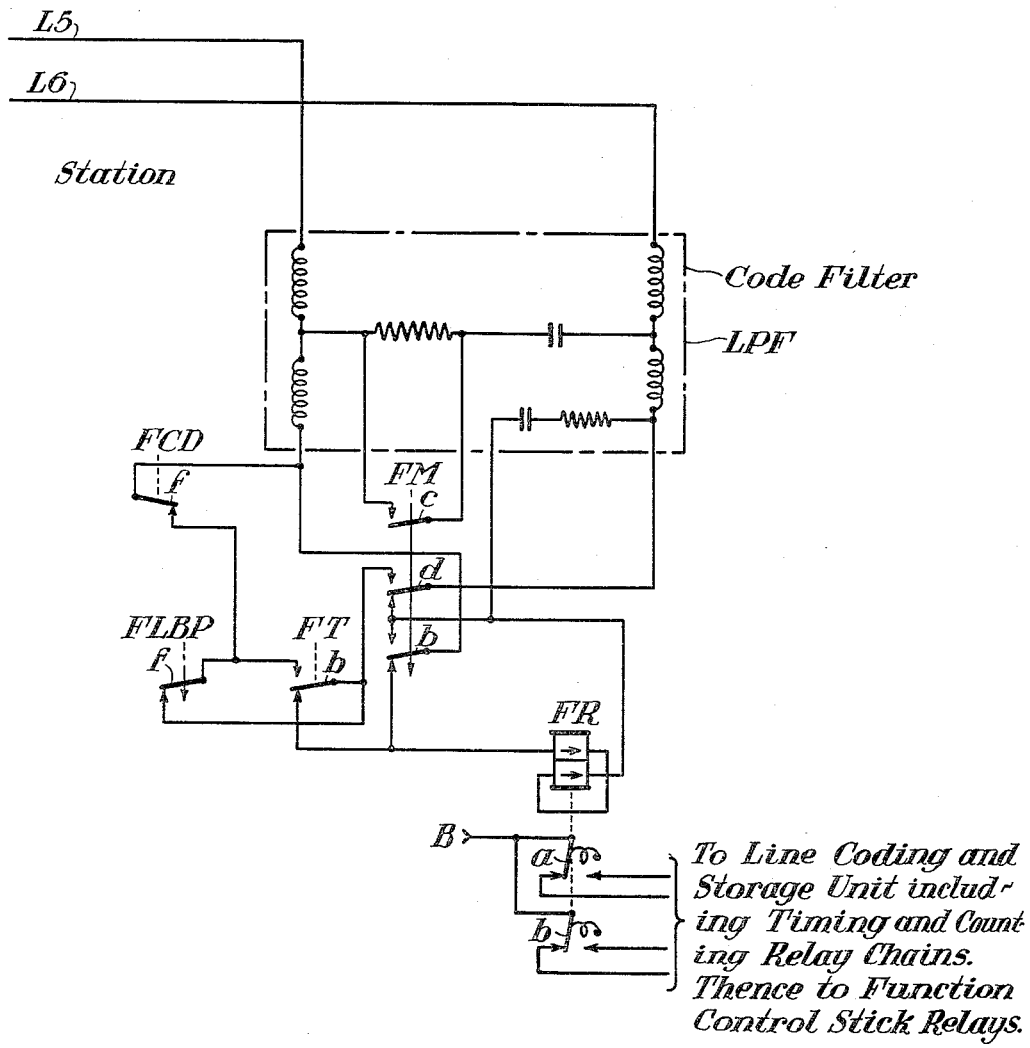
Figure 2A:
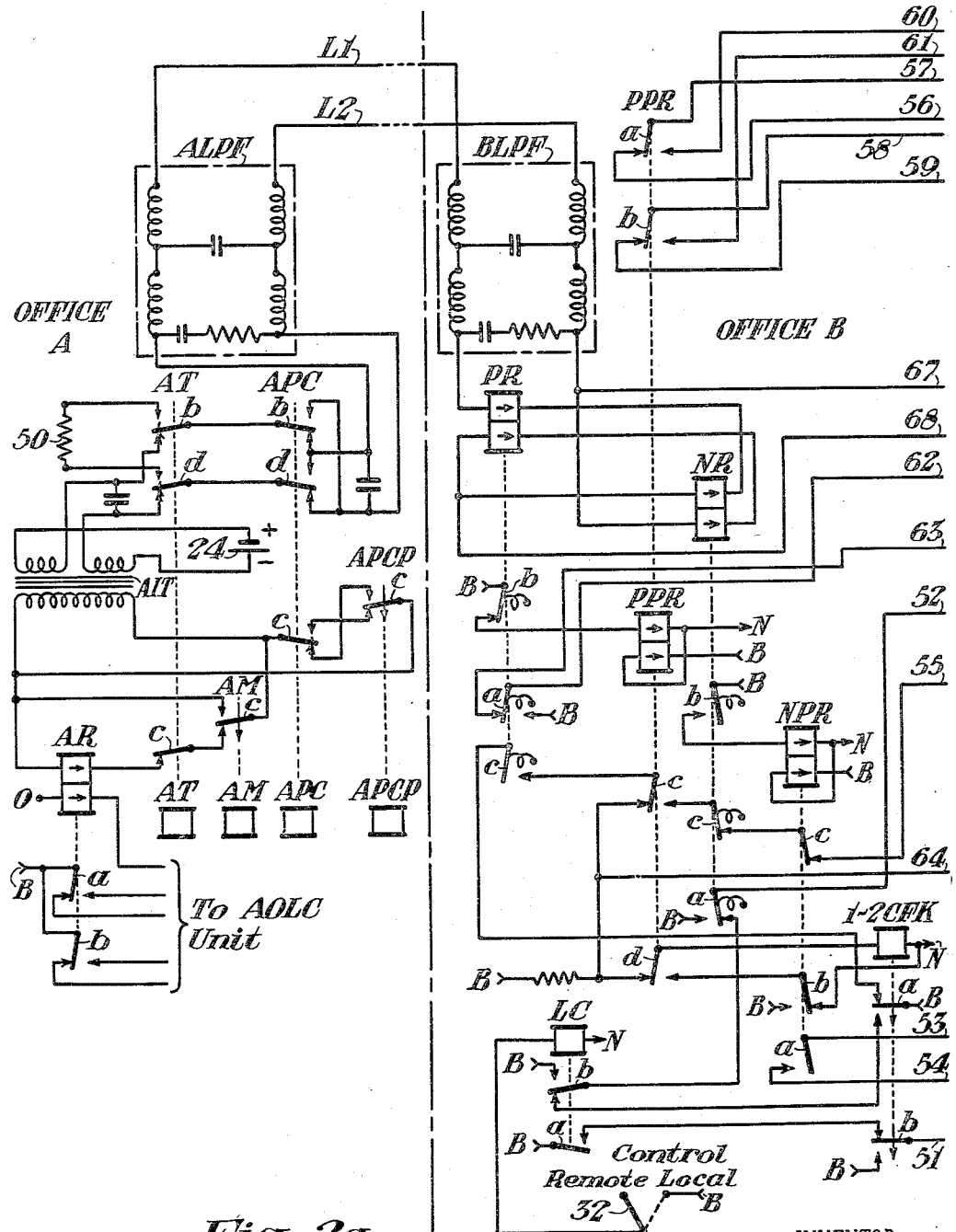
Figure 2B:
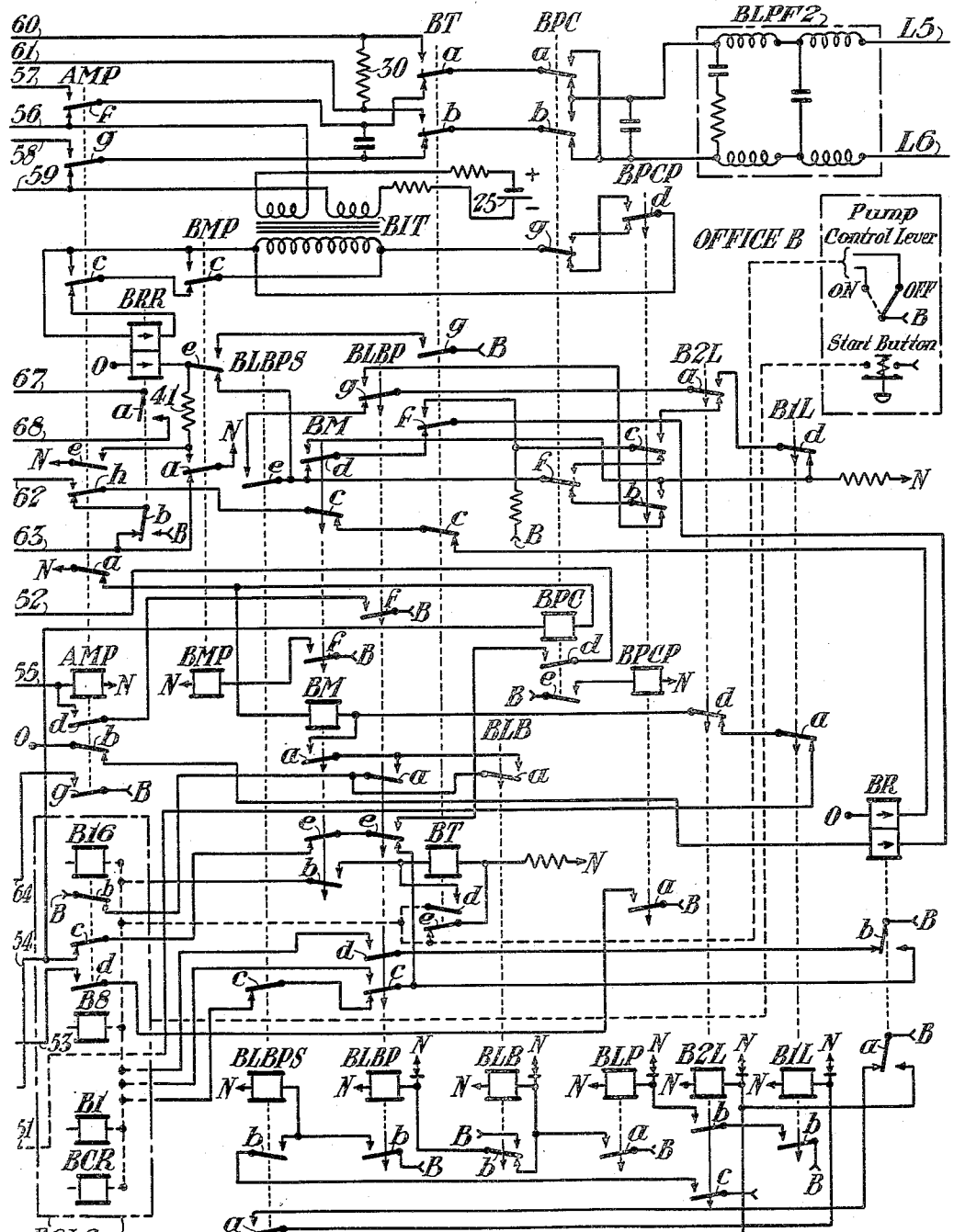

Figs. 2a and 2b of the drawings, when taken together with Fig. 2a to the left, show a second form of apparatus embodying my invention in which the two office locations are connected by a half-duplex channel of the type usually used in such remote control systems. Again the secondary office location is situated between the master office and the stations which are to be controlled by either control location. It is to be noted that the stations in this case are the same as that typified in Fig. 1d, which may be used to the right of Fig. 2b to provide a showing of a complete system.

Similar reference characters refer to similar parts in each of the drawings.

Figure 1B:
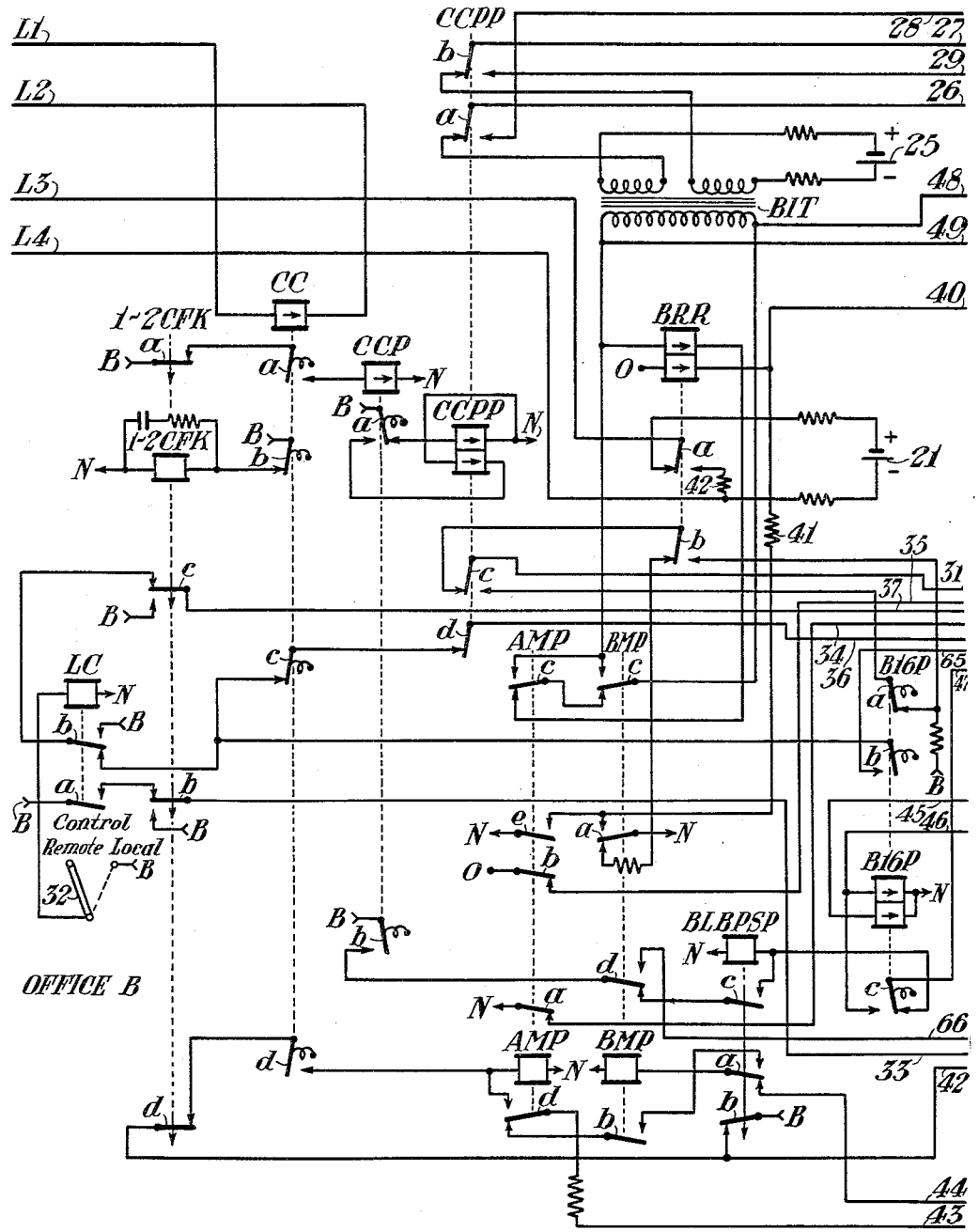

As previously mentioned, the four parts of Fig. 1 show in condensed form a remote control system comprising two control points and one station location. In Fig. 1a, there is shown the circuit arrangement at the master control point or office A, as designated on the drawing. Figs. 1b and 1c show the circuits at a secondary control point or, as designated in the drawing, office B. Finally, Fig. 1d shows the line circuit connections, including the line relay FR, at a station location. My invention does not involve any of the circuit connections or arrangements used at the field stations of the system. Therefore, the circuits shown in Fig. 1d are typical for any station in the particular system which I have chosen to illustrate my invention. The particular system here shown to illustrate the novelty of my invention is basically that system shown in the previously mentioned Patent No. 2,411,375. Thus, for a full showing of the circuit arrangement at a field station in the system, reference may be had to Fig. 2 of this reference patent and the rest of the circuit connections need not be shown in this application. It is to be noted that the system of the mentioned patent is of the 16 step type. That is, each code, whether a control code or an indication code, consists of 16 code steps.

The circuit arrangement shown in Fig. 1d may also be used with Fig. 2 of this application to illustrate a station location in the second form of my invention. For this reason, the code filter LPF is shown as part of the line circuit connections at this station, although not necessary in the system illustrated by Fig. 1. If desired, the filter may be used in the system of Fig. 1, but it is necessary in the system of Fig. 2.

As previously mentioned, the master and secondary office locations in Fig. 1 are connected by a duplex communication channel. As illustrated, this channel consists of the line wires L1, L2, L3, and L4. Wires L1 and L2 furnish the circuit from office A to office B with line wires L3 and L4 furnishing the return path from B to A. It is to be understood that although shown as four line wires, this duplex channel may consist of any other known type of channel; i. e., radio, carrier, microwave, etc. The secondary control office and the station are connected in a usual manner by a half duplex channel which is illustrated as being the line wires L5 and L6. These line wires may be the line wires of a communication path in which case the code filter LPF illustrated in Fig. 1d is necessary. In this event, a similar filter must be inserted in the line circuit connections at office B. It is also to be understood that the channel between office B and the stations may be a carrier channel of any well-known type, the use of such channels in these remote control systems being well-known in the particular art.

In the office circuits, only those pertaining to my invention, or necessary for an explanation thereof, have been shown. In other words, in the master office or office A of the system, only the master relay, the transmitter relay, the pole-changing relays, and the timing chain relays and their associated circuits are shown in detail. The counting chain circuits, the pyramid and station selection circuits, the function registry and control relays and their circuitry, and the starting relays which complete the office line coding unit are shown conventionally by the dot-dash box designated by the reference AOLC. Since the details are unrelated to my invention, for a complete understanding of the particular system shown as an illustration, reference is again made to the above mentioned Patent No. 2,411,375. A few of the counting chain relays whose contacts enter into the control circuits for my invention have been shown conventionally inside the box. For example, relays A1, A8, A16 and ACR are shown at the master office location, although no specific control circuits for these relays are indicated.

At each of the office locations shown in Fig. 1, and also in Fig. 2, to be discussed later, a local power source of direct current energy is provided. This is illustrated in each case as a battery having a positive terminal B, a negative terminal N, and a center tap terminal O. Throughout the drawings of this application, it is to be noted that the contacts of relays which are slow acting, in this case, slow to release, are so designated by an arrow, pointing downward, intersecting the armature. Also, where a transfer contact is of the continuity type, that is, the front contacts are closed before the back contacts open, it is so marked by an arc appended to the armature near its open end. For example, in Fig. 1a, contacts b and c of relay AT are both of the continuity transfer type.

Since a full duplex channel is used between office A and office B, the line circuit connections and control circuits at office A are similar to those for the office location in a coded carrier control system, such as is shown in Letters Patent of the United States No. 2,303,875, issued to G. W. Baughman and N. F. Agnew on December 1, 1942, for a Remote Control System. Thus the office relay AR at location A is controlled by the line relay ARR through capacitor 20. It is to be noted that relay ARR is of the biased type. In other words, when current flows through the relay winding in the direction of the arrow, the relay contacts are operated to the normal or left hand position as shown in the drawings. When current flows through the relay winding in the opposite direction, or when no current is flowing, the contacts are operated to the reverse or right hand position as shown in the drawing. This relay is normally energized over line wires L3 and L4 by current from line battery 21 at office B, the direction of current flow being such as to hold the relay contacts in their normal position.

When this line circuit is opened at contact a of relay BRR (Fig. 2b), in a manner to be explained later, relay ARR is deenergized and its contacts operated to their reverse position. This causes a pulse of current to flow in the circuit traced from terminal B of the local power source through resistor 22, reverse contact *a* of relay ARR, capacitor 20, back contact *a* of master relay AM, back contact *a* of transmitter relay AT, and the upper winding of relay AR to terminal 0 of the local power source. Because of capacitor 20, this pulse of current is of short duration only. However, relay AR is of the magnetic stick type, that is, when the relay is deenergized its contacts remain in the position to which they were last operated. When current flows through either winding of this relay in the direction of the arrow, the relay contacts are operated to their normal or left hand position. Current flowing through either winding in a direction opposite to the arrow causes the relay contacts to be operated to the reverse or right hand position. Therefore, the pulse of current flowing in the circuit just described flows through the upper winding of the relay in a direction opposite to that of the arrow so that the relay operates its contacts to their reverse position. The circuit through which the current flows to operate these relay contacts to their normal position may be traced from terminal N of the source through resistor 23, normal contact *a* of relay ARR, and thence through the circuit above traced including the upper winding of relay AR to terminal O of the source. Current flow in this case would be in the direction of the arrow, as may be readily seen. It is obvious then that coded operation of the contacts of relay ARR, that is, alternately between their normal and reverse positions, will cause relay AR to also periodically operate its contacts between their reverse and normal positions. As will be explained shortly, codes are received at office location A in this manner.

The transmission of codes from office A is controlled by a relay ATP which is normally a repeater of the office transmitter relay AT. Relay ATP transmits these codes by interrupting, at its reverse contacts *a* and *b*, the energy supplied to the line circuit L1—L2. The circuit L1—L2 is normally supplied with direct current energy from a line battery 24 over these reverse contacts *a* and *b*. When relay ATP is energized so that its contacts operate to their normal position, the supply of energy to the line circuit is interrupted and a resistor 50 is connected across the line wires in order to bleed off any static charges remaining in the circuit. The energy normally supplied to this line circuit is received at office B by a relay CC which will be discussed shortly.

Relay ATP is a biased relay which is normally deenergized. During the transmission of control codes from this location, relay ATP is controlled directly by relay AT, which in turn is controlled by the coding unit. When relay AT is energized and picks up, the closing of its front contact *b* energizes relay ATP through a circuit traced from terminal B over front contact *b* of relay AT, back contact *a* of relay APC, and the winding of relay ATP in the direction of the arrow to terminal N. When relay AT releases, this circuit is opened and the circuit over back contact *b* is incomplete due to the open front contact *a* of relay APCP. Relay ATP is also controlled during an indication code to provide a reset pulse during the final step of the indication code. In this instance, relay ATP is energized by a circuit traced from terminal B over front contact *a* of relay APCP which is picked up at this time, front contact *a* of relay A16, back contact *a* of a relay 1LPP, back contact *c* of relay AT, front contact *b* of relay APC which is also picked up during indication codes, and through the winding of relay ATP to terminal N. Other circuits are at times completed for energizing relay ATP. These, however, are more appropriately discussed later during the description of the operation of the system.

Office A is of course provided with a transmitter relay AT, which determines finally the characteristics of the codes transmitted from this location. Relay AT, as shown in detail in the patents hereinbefore referred to, is controlled by the counting and timing chain relays and the various function control levers to set up these characteristics of the control codes. Relay AT is energized at the beginning of a control code initially over a pick up circuit which includes the contact of a starting relay, the various relays of the pyramid circuits and other relays in the coding unit, thence over front contact *b* of master relay AM, which is picked up only during control codes, and through the winding of relay AT to terminal N. Relay AT is further provided with various stick circuits which hold the relay up or hold the relay released according to the station selection desired and the function controls designated. These holding circuits for relay AT pass over various circuits, here shown conventionally and described in detail in Patent No. 2,411,375, which include either front contact *d* or back contact *e* of relay AT. The actual time during which relay AT is held up or held released is determined by various ones of the timing relays as also described in the aforementioned patent.

As previously mentioned, master relay AM is energized only during control codes over a circuit originating in the coding unit and including back contacts *a* of the timing relays A1L and A2L, respectively, to assure that no other coding action is taking place at that particular time. Relay AM remains held up during an entire control code by a circuit from terminal B over back contact *b* of relay A16, front contacts *a*, in multiple, of timing relays ALB and ALBP, front contact *c* of relay AM, and the relay winding to terminal N.

During a control code, relay AR is driven by relay AT in order to cause the coding action to progress from one code step to the next, since relay AR, as will be described shortly, controls both the timing and the counting relay chains. When relay AT picks up, a circuit is completed from terminal B over front contact *f* of relay AT through the lower winding of relay AR to terminal O of the source. Since the flow of current is in a direction opposite to the arrow, relay AR operates its contacts to their reverse position. Each time relay AT releases, closing its back contact *f*, a circuit is completed from terminal N over front contact *d* of relay AM, which is closed during a control code, back contact *f* of relay AT, and the lower winding of relay AR to terminal O. In this instance, the flow of current through the relay winding is in the direction of the arrow and the relay contacts are operated to their normal position.

The code following operation of relay AR activates both the timing chain relays and the counting chain relays in the coding unit. For example, when relay AR initially operates its contacts to their reverse position on the first step of the code, a circuit is completed from terminal B over reverse contact *a* of relay AR through the winding of timing relay A2L to terminal N. A branch path runs over back contact *a* of relay ALBPS through the winding of timing relay A1L to terminal N. Thus, these two timing relays initially are energized and pick up closing front contacts. Closing of front contacts *b* of these two relays completes an obvious circuit for energizing relay ALP, which likewise picks up to close its front contacts. Closing of front contact *a* of relay ALP completes a circuit for energizing both relay ALB and relay ALBP. The circuit for the latter relay also includes back contact *b* of relay ALB. When relay ALB picks up to close its front contact *b*, a holding circuit for relay ALBP is completed from terminal B over this front contact *b* and through the relay winding to terminal N. It is to be seen then that when the timing relays release, the release of relays ALB and ALBP is in cascade. Relays ALB and ALBP are bridging relays which are picked up continuously during the transmission or receipt of an ordinary code, that is, one which completes without interruption. The stick relay ALBPS is energized over front contact *b* of relay ALBP and thus likewise remains picked up during the coding action. This stick repeater relay of the bridging relay ALBP is used here in the same manner as used in the previously mentioned Patent No. 2,442,603. In this way, the system shown in this application differs from that in the previously mentioned Patent No. 2,411,375. Relay ALBPS is at times held up by a stick circuit traced from terminal B over front contact c of relay A2L, front contact b of relay ALBPS and the relay winding to terminal N. This stick circuit is effective in case a code is stalled on an odd numbered code step.

When relay ALBPS picks up, the opening of its back contact a interrupts the initial energizing circuit for relay A1L and this relay is deenergized. However, since all of the timing relays except the bridging relay stick repeater are of the slow release type, relay A1L holds up for a time and will release during the first code step only if a control code is in progress. In other words, relays A1L and A2L when deenergized hold up through a short code step and releases only if the code step is of a long character. The closing of front contact a of relay ALBPS completes a circuit by which relay A1L may be energized when relay AR again moves its contact a to the normal position. Thus during the first step of any code, the circuits are established by which the timing relay A1L is deenergized during the odd numbered code steps with relay AR reversed, and energized during the even numbered code steps, while the timing relay A2L is deenergized during the even numbered code steps, that is, when relay AR is normal, and is energized only during the odd numbered code steps. As explained in the previously mentioned patents, these two timing relays help to determine the characteristics of the various code steps transmitted from a location or serve to keep the coding equipment in synchronization with a received code. Relay ALP is deenergized anytime that either of the two initial timing relays release. During a long code step, sufficient time elapses for slow release relay ALP to also release its contacts. However, as mentioned above, the remaining relays in the timing chain, that is, the bridging relays and their stick repeater, remain held up during a complete code.

Relay AR also controls the operation of the timing chain in the coding unit through the alternate operation, that is, the code following operation, of its contacts b. When relay AR initially operates to its reverse position, a circuit is completed from terminal B over its reverse contact b and back contacts c of relays ALBP and ALBPS to the timing chain relays, or, as specifically shown in the Patent No. 2,411,375, to the winding of relay A1 which then picks up. As previously mentioned, the timing chain is here shown only conventionally in an outline form with the relays A1 and A8 representing the chain of relays which are successive in number from A1 to A8. The chain repeat relay ACR, also shown, picks up during the eighth code step to cause a repeat action of the counting chain from relay A1 to relay A7, the relay A16 picking up on the 16th step in place of relay A8. Thus relay A16, in this particular system, is the last relay in the counting chain action. When relay ALBP of the timing chain picks up closing its front contacts c and d, the circuits are established to control the complete action of the timing chain with the energy supplied from terminal B alternately over normal and reverse contact b of relay AR during its code following action. It is believed that this outline of the action of the counting chain is sufficient for purposes of understanding my invention, as the counting chain relays, except for the contacts specifically shown in Fig. 1, are not involved in the operation of the novel circuit arrangement which I have here provided.

Office A is further provided with a relay 1LPP which is used to repeat a long first step of any code. Relay 1LPP is energized over a circuit traced from terminal B over back contact c of relay A1L, back contact a of relay ACR, front contact a of relay A1, and through the relay winding to terminal N. A stick circuit, traced from terminal B over front contact d of relay ALBPS, front contact b and the winding of relay 1LPP to terminal N, holds this relay energized once it has been picked up. It is to be seen that the energizing circuit for relay 1LPP checks that relay A1L has released, which occurs only during a long code step, and that relay ACR is released and relal A1 picked up. This latter check assures that it is the first step of the code by determining that relay A1 is picked up during the first cycle of the counting chain relays when relay ACR is released. Relay 1LPP and its contacts are used when office B is transmitting a control code in a manner which will be explained later during the discussion of the complete operation of my system.

Control codes from office A are received at office B by the line relay CC. Relay CC is of the biased type and is, as previously mentioned, normally energized by battery 24 over line wires L1 and L2 and reverse contacts a and b of relay ATP. The release of relay CC is repeated by the relay CCP. This latter relay is also of the biased type and is normally deenergized, becoming energized when relay CC releases, by the circuit from terminal B over front contact a of a relay 1-2CFK, reverse contact a of relay CC, and the winding of relay CCP to terminal N. The operation of relay CCP is in turn repeated by a second repeater relay CCPP which is of the magnetic stick type and has two windings. Relay CCPP is normally energized in the normal direction over reverse contact a of relay CCP, with the current flowing through the upper winding of this second repeater relay in the direction of the arrow. When relay CCP is energized and operates its contacts to their normal positions, current flows from terminal B over normal contact a of relay CCP through the lower winding of relay CCPP in the reverse direction to terminal N. Relay CCPP operates its contacts at this time to their reverse position.

The code following operation of relay CCPP, according to the code being transmitted from office A, causes the transmitted code to be repeated from office B to the stations. With the apparatus at-rest or, in other other words, with relay CCPP in its normal position, the line circuit connections at office B may be traced from the positive terminal of the line battery 25 through a line resistor and one primary winding of the impulse transformer BIT over normal contact a of relay CCPP, wire 26, back contact a of transmitter relay BT, and back contact a of relay BPC to line wire L5 and thence to the stations. The return path is over line wire L6, back contacts b, in series, of relays BPC and BT, wire 27, normal contact b of relay CCPP, and a secondary primary winding of the impulse transformer and a second line resistor to the negative terminal of battery 25. When relay CCPP operates to its reverse position, the wires 26 and 27, which are in effect extensions of line wires L5 and L6, are connected over reverse contacts a and b of relay CCPP across a bleeder resistor 30, on Fig. 1c. This interrupts the energy supplied to the line circuit and, at the same time bleeds off any stored energy in line wires L5 and L6. It can be seen then that the periodic or code following operation of relay CCPP, which repeats the operation of relay CC and in turn the code transmitted by office A, causes the line circuit from office B to the stations to be alternately interrupted and supplied with energy in a pattern identical to that of the transmitted code.

The operation of relay CCPP, through its contact c, also drives the office coding unit at location B to maintain this unit in synchronization with the general coding action and prevent it from initiating a code. This synchronizing action is accomplished by driving relay BR over a circuit which may be traced from terminal O of the local battery source through the upper winding of relay BR, over back contacts c of relays BT and BM, wire 31, and then either over normal contact c of relay CCPP, normal contact b of relay BRR, and back contact a of a relay BMP to terminal N, or over reverse contact c of relay CCPP and reverse contact a of a relay B16P to terminal B. This operation will be more fully explained hereinafter during the discussion of the complete operation of the system.

The code transmitted over line wires L5 and L6 by the code following operation of relay CCPP is received at the station shown in Fig. 1d by line relay FR, which is a biased type relay shown as having two windings connected in series, although a single winding relay may be used as is well understood by those skilled in the art. The code pulses are received over line wire L5 which is the normally positive line wire and pass through the left hand coils of the code filter LPF, back contact *b* of the relay FM, the windings of relay FR in the direction shown by the arrows, back contact *d* of relay FM, and the right hand coils of code filter LPF to line wire L6. Relay FR thus follows the code pulses received over the line circuit and operates its contacts *a* and *b* between their normal and reverse positions, according as the relay is energized or deenergized. This operation of relay FR controls the line coding and storage unit at this particular station in a manner described in full in Patent No. 2,411,375. Since the circuit arrangement at the station forms no part in my invention, reference is made to this patent for a complete description of the operation, it being sufficient here in describing the operation of my invention to merely show that relay FR is or is not operated by the various codes.

During the transmission of indication codes from this station, the LCS unit operates also as described in this last mentioned patent with the line circuit connections being reversed by contacts *b* and *d* of relay FM and with transmitter relay FT alternately shunting the line circuit and then connecting the line relay to the line circuit in keeping with the characteristics of the indication code. It is believed that this general understanding of the operation of the apparatus at the field station is sufficient to understand the description of the operation of the novel circuit arangement at the two office locations which form the circuits of my invention. It is to be noted that, in order to provide a better understanding of the operation of the circuits at the station, the designations of the relay contacts and the various other items are identical with the reference characters used in the previously mentioned patent with the exception that the prefix F has been added to the designations of the various relays here to distinguish them from the similar relays at the two office locations. Also, any slight differences in the connections of the various components of the code filter LPF in the circuits are in keeping with present practices rather than those shown in the reference patent.

Office B is also equipped with coding apparatus which is capable of transmitting control codes to the stations. However, this office location becomes the control location only when so designated and to this end a manually selective control lever is provided by which the operator at office B may assume control of the stations beyond his location, in this particular instance the station shown in Fig. 1d. Thus there is shown, in Fig. 1b, a control lever whose operating arm 32 is moved from the remote position in which it is shown to the local position shown dotted in the drawing when the operator at B is to assume control. Energy is supplied over this operating arm in the local position to the winding of a local control relay LC which then picks up, closing its front contacts to complete certain circuits which give the operator at office B control of the line circuit beyond his location. It is to be understood that this shifting of control may be done by remote control means under the direction of the operator at office A who by a control code may transfer the control of the far portion of the line circuit to the operator at office B. However, for simplicity, in the present application the shift of control is shown as being accomplished by the manually operable lever in Fig. 1b.

Office location B is therefore provided with a transmitter relay BT and a master relay BM which function in a manner similar to that described for the equivalent relays at office location A. However, relay BM has an energizing circuit which is slightly different from the usual circuit, since only at certain designated times is this relay to be effective in controlling the coding action. For example, the pick-up circuit for relay BM can be traced from terminal B over front contact *a* of local control relay LC, front contact *b* of a circuit fault indication relay 1–2CFK, and wire 33, thence through the starting relay contacts and the pyramid circuit contacts in the coding unit BOLC shown conventionally in Fig. 1c, and over back contacts *a* of relays B1L and B2L of the timing chain, the winding of relay BM, wire 34, and back contact *a* of a relay AMP to terminal N. In other words, when relay LC is picked up to designate or permit office location B to have control, pushing of a start button in the control equipment will allow relay BM to pick up in the usual manner, unless a code is in progress from location A as would be indicated by relay AMP, which will be more fully discussed later. Once picked up, relay BM is held energized by the circuit traced from terminal B over back contact *b* of relay B16, front contacts *a*, in multiple, of relays BLBP and BLB, and front contact *a* and the winding of relay BM, and thence over wire 34 and back contact *a* of relay AMP to terminal N. Transmitter relay BT is initially energized in the usual manner over circuits in the coding unit and thence over front contact *b* of relay BM through the winding of relay BT to terminal N. As previously discussed in connection with relay AT at office location A, relay BT is likewise controlled by stick circuits which either hold the relay energized or hold the relay released. These stick circuits, as before, include front contact *d* and back contact *e* of relay BT itself.

During the transmission of a control code from office B, the timing and counting chain relays are controlled in the usual manner by relay BR which in turn is controlled by transmitter relay BT to determine the characteristics of the code. The circuit for controlling relay BR in this case may be traced from terminal O of the local source at back contact *b* of relay AMP, in Fig. 1b, over wire 35, the lower winding of relay BR, and either front contact *f* of relay BT to terminal B, or back contact *f* of relay BT and front contact *d* of relay BM to terminal N. The code following operation of contacts *a* and *b* of relay BR between their normal and reverse positions controls, respectively, the operation of the timing chain relays and the operation of the counting chain relays in a manner equivalent to that already described for office location A. This operation will be obvious from an inspection of the drawings when considered with the previously described operations at office A.

Office location B also includes a pole-changing relay BPC which is utilized to pole-change line circuit L5—L6 to permit a station to transmit an indication code. It is to be noted, as explained in the previous patents, that this pole-changing action is necessary where more than one station is connected to the line circuit in order to lock out those stations which are not transmitting a code or which are of a lower priority for transmitting their indication codes. Relay BPC is initially energized on the first step of an indication code, when relay BR operates to its reverse position, over a circuit traced from terminal B over reverse contact *b* of relay BR, back contacts *e*, in series, of relays BLBP and BM, back contact *a* of relay B16, the winding of relay BPC, wire 34, and back contact *a* of relay AMP to terminal N. It is to be noted that during an indication code relay BM does not pick up, therefore its back contacts are closed. When the timing chain relay BLBP is energized and picks up to close its front contact *e*, the pick up circuit for relay BPC is interrupted but a stick circuit is completed at that time which may be traced from terminal B at front contact *c* of relay BPC over wire 36, normal contact *d* of relay CCPP, normal contact *c* of relay CC, back contact *b* of relay LC, front contact *c* of relay 1–2CFK, wire 37, front contact *d* of relay BPC, front contact *e* of relay BLBP, back contact *e* of relay BM, back contact *a* of relay B16, the winding of relay BPC, and wire 34 to terminal N at back contact a of relay AMP. This circuit will hold relay BPC energized until the final step of the code when back contact a of relay B16 opens. However, normal contact b of relay B16P, which repeats the operation of relay B16, closes during the last step to by-pass a portion of the initial stick circuit and hold relay BPC energized until a reset pulse can be received from office location A.

Office B is also provided with a line relay BRR which is primarily utilized to pass indication codes received from the stations on to office A. This relay occupies a position equivalent to the office line relay in the usual direct current remote control system, for example, relay OR in either Patent 2,411,375 or 2,442,603. In my invention, this additional relay is necessary in the operation of the general system, to accomplish certain checks and lockouts during the synchronization procedures and to prevent double coding. Relay BRR is also used to transmit control codes originating at office B to office A in the synchronizing procedures. When an indication code originating at a field station is being received at office B, the alternate shunting and releasing of the line circuit by transmitter relay FT at the station causes the current flowing through the primary windings of impulse transformer BIT to vary in a pulse rate according to the indication code. The pulses induced in the secondary winding of this transformer flow through the upper winding of relay BRR and cause it to operate between its normal and reverse position in accordance with the characteristics of the code. Relay BRR is of the magnetic stick type and its contacts must thus be driven between their two positions. The circuit for this may be traced from the left hand terminal of the secondary winding of transformer BIT through the upper winding of relay BRR, and over back contacts c of relays AMP and BMP to the right hand terminal of the secondary winding. Thus the increase and decrease of the line current flowing in the primary windings is translated into pulses of current from the secondary winding which cause relay BRR to operate its contacts between their normal and reverse postitions.

During the transmission of a control code from office B, relay BRR is operated to its reverse position each time transmitter relay BT picks up during an odd numbered code step. The circuit for this may be traced from terminal B over front contact g of relay BT, wire 40, and through the lower winding of relay BRR, in a direction opposite to the arrow, to terminal O. When relay BT releases, during the even numbered code steps, the circuit traced from terminal O through the lower winding of relay BRR, resistor 41, and front contact a of relay BMP, which is up at this time, to terminal N becomes effective to cause relay BRR to operate its contacts back to their normal position. It is to be noted that resistor 41 in this latter circuit reduces the current flow to an extent that when relay BT is picked up the current flow in the reverse direction through the lower winding of relay BRR is the controlling energy.

When relay BRR is in its normal position, energy is supplied from line battery 21 over normal contact a of relay BRR to line wires L3 and L4 and thence to line relay ARR at office A, which is held energized under these conditions. Movement of contact a of relay BRR to its reverse position opens the connection to the line battery deenergizing relay ARR which, being a biased relay, operates to its reverse position. Reverse contact a of relay BRR also connects a bleeder resistance 42 across the line wires to bleed off any stored energy in the line circuit. Thus the code following action of relay BRR is repeated by relay ARR whether it be an indication code received from a field station or a control code originating at office B.

During the receipt of an indication code from a station, the operation of contact b of relay BRR also drives office relay BR in order to cause the coding apparatus at office B to follow the indication code and record it. This circuit is traced from terminal O through the upper winding of relay BR over back contacts c of relays BT and BM, wire 31, normal contact c of relay CCPP, and either normal contact b of relay BRR and back contact a of relay BMP to terminal N, or reverse contact b of relay BRR to terminal B. Thus the operation of relay BRR to follow an indication code transmitted from a station to this office location not only operates the local coding apparatus at office B to record this indication code but retransmits the indication code to office A where it is also recorded in the indication circuits.

Office B is also provided with two master relay repeaters, one for the master relay at each office location. In other words, relay AMP at office B repeats the picked-up position of master relay AM at office A while relay BMP repeats the picked-up position of master relay BM at office B. The energizing circuit for relay AMP may be traced from terminal B at back contact b of the bridging stick relay repeater, relay BLBPSP over front contact d of relay 1-2CFK, reverse contact d of relay CC, and the winding of relay AMP to terminal N. In this circuit, it is the reverse contact d of relay CC which provides the actual indication that the master relay at office A has picked up and that office A is in condition for transmitting a control code. An alternate energizing circuit for at times by-passing back contact b of relay BLBPSP includes back contact a of relay BCR, front contact a of relay B1, and wire 42. Relay AMP is held energized by a stick circuit traced from terminal B over front contact f of relay BLBP, which is picked up during any coding action, wire 43, and front contact d and the winding of relay AMP to terminal N. Relay BMP is energized over a circuit traced from terminal B over front contact f of relay BM, wire 44, back contact a of relay BLBPSP, and the winding of relay BMP to terminal N. A stick circuit for relay BMP, which is effective under certain conditions, may be traced from terminal B at front contact f of relay BLBP over wire 43, back contact d of relay AMP, front contact b of relay BMP, front contact a of relay BLBPSP, and the winding of relay BMP to terminal N.

There is also provided at office B a last-code-step repeater relay designated by the reference B16P. The control circuits of this relay are so arranged that it is energized to repeat the final code step in either an office B control code or any indication code. However, this relay does not repeat the final code step of a control code from office A. Relay B16P is a two winding relay of the biased type. During control codes from office B, this relay is energized over a circuit traced from terminal B at front contact g of relay BM over front contact c of relay B16, wire 45, and the lower winding of relay B16P to terminal N. During indication codes, relay B16P is energized over the circuit traced from terminal B at front contact a of relay BPCP, which is closed during indication codes, over front contact d of relay B16, wire 46, and the upper winding of relay B16P to terminal N. A stick circuit is used to hold relay B16P energized, this circuit being traced from terminal B over front contact d of relay BLBPS, wire 47, normal contact c of relay B16P, and the upper winding of that relay to terminal N. The contacts of relay B16P are utilized to interrupt certain operating circuits, or to by-pass other relay contacts to hold certain relays energized under conditions of the coding action where the contacts of the final relay of the counting chain, relay B16, cannot be used.

Also located at office B is the previously mentioned repeater relay of the bridging repeater stick relay. This relay BLBPSP is energized over a circuit completed from terminal B over front contact d of relay BLBPS, wire 47, reverse contact c of relay B16P, and the winding of relay BLBPSP to terminal N. Under certain conditions, relay BLBPSP is held energized by a stick circuit which includes normal contact *b* of relay CCP, back contact *d* of relay BMP, front contact *c*, and the winding of relay BLBPSP.

Office B is further provided with a line fault indication relay designated 1–2CFK. This relay is used to indicate a fault on line circuit L1—L2 which interrupts normal coding action for some period. The relay is normally energized over normal contact *b* of relay CC. It is made slow release by the resistor-capacitor combination in parallel with the relay winding in order to bridge the open circuit time during the normal coding action of relay CC. However, if a circuit fault deenergizes relay CC for an extended period greater than the release time of relay 1–2CFK, the relay releases and opens its front contacts. Opening of front contact *a* of the fault indication relay interrupts the energizing circuit for relay CCP which is completed when relay CC releases its contact *a*. This prevents any possible coding action, resulting from an intermittent fault, which would appear as though it were originating at office A. The energizing circuit for relay AMP is also interrupted by the opening of front contact *d* of the fault indication relay to prevent this M repeater relay from indicating that office A is transmitting a control code. The terminal B connections at back contacts *b* and *c* of relay 1–2CFK provide energy to the circuits for relays BM and BPC, respectively, to enable office B to take over the control of the line circuit and associated stations beyond this location. This permits office B to control, and receive indications from, these stations in spite of a circuit fault in the line circuit between the two office locations. It is noted that in each case these back contacts, that is, back contacts *b* and *c* of the fault indication relay, override or supplement the operation of the control lever and local control relay LC. Thus, if relay LC is remotely controlled from another location to designate when office B is to control the stations, the line fault indication relay overrides this control and permits office B to assume such control as is necessary in the operation of the system. The full use and utility of the relays discussed in this particular paragraph and the two paragraphs immediately preceding will be more fully explained and described during the following description of the general operation of the system of my invention.

Although not specifically mentioned in discussing the various relays and apparatus, office A is also provided with a pole-changing relay APC and its repeater relay APCP which function during the receipt of indication codes to set up certain circuits to enable the location to properly receive the indication code and provide certain reset pulses on the final step of that code. It is to be noted, however, that at office A the pole-changing relay does not change the polarity of the line circuits since the channel between the two offices is of the duplex nature.

I shall now describe the general arrangement, including the various relays and circuits, of the second form of my invention shown in Fig. 2. It is to be remembered that the field station shown in Fig. 1*d* is typical for any of the systems embodying my invention and may be used in connection with the particular office circuit arrangement shown in Fig. 2. In Fig. 2, office location B is shown in the right portion of Fig. 2*a*, that is, to the right of the dot-dash line which bisects this drawing vertically, and in Fig. 2*b*. Office location A is shown in the left portion of Fig. 2*a*, that is, to the left of the previously mentioned dot-dash line.

The most prominent distinguishing feature between the two forms of my invention illustrated is the communication channel between the two office locations which, in the form in Fig. 2 is of the half-duplex communication channel type, similar to that between office B and the field station in both forms. This communication channel consists of a single circuit here illustrated as the line wires L1 and L2 extending between office A and office B.

This circuit is used for communication, that is, for the transmission of codes in both directions, between these two office locations.

The apparatus and circuit arrangement at office A, in this form of my invention, may be identical to the office circuits and apparatus shown in either of the previously mentioned Patents Nos. 2,411,375 or 2,442,603. Since these circuits are not part of my invention, only the line circuit connections at office A are shown in the present application. For purposes of this application, it will be considered that the complete apparatus at office A is the same as shown for the office in Patent No. 2,411,375 except for the timing relay chain, which will be considered as identical with that here shown in Fig. 2*b* for office B and which differs slightly from that shown in the patent by the addition of the final bridging stick relay LBPS. In transmitting and receiving codes, the operation of the apparatus at location A will be considered the equivalent of that described in Patent No. 2,411,375, particularly in reference to the line circuit connections herein shown in Fig. 2*a*. One minor exception in these line circuit connections includes back contact *c* of transmitter relay AT in the circuit connections to the upper winding of line relay AR. For purposes of this discussion, however, this contact does not affect the general operation of the apparatus as described in Patent No. 2,411,375 and reference is made to this patent for an understanding of the complete operation of the apparatus at office location A.

Office location A includes a line battery 24 by which the line circuit between office A and office B is normally energized. The line connections at office location A may be traced from the positive terminal of battery 24 through the left hand primary winding of an impulse transformer AIT, over back contact *b* of transmitter relay AT and back contact *b* of pole-changing relay APC, through the left hand induction coils in series of the low pass line filter ALPF to line wire L1, returning over line wire L2 through the right hand induction coils of filter ALPF, back contacts *d* of relays APC and AT, respectively, and the right hand primary winding of the impulse transformer to the negative terminal of the line battery. The purpose of the low pass or code filter used at this office location and also at office location B between the apparatus and the line circuit is to permit the use of the communication channel, or as here shown the line circuit, for other communication purposes, that is, normal telephone or carrier transmission. The same type filters are used, as will be later described, between the apparatus at office B and at the field station shown in Fig. 1*d* and line circuit L5—L6. The use of such filters is well known to the art and need not be more fully explained in the present application.

Control codes are transmitted from office A by the operation of transmitter relay AT, which is controlled by the coding unit in a manner previously described. Contacts *b* and *d* of relay AT periodically open the line circuit, according to the characteristics of the control code being transmitted, during the code steps when the line circuit is open. The bleeder resistor 50 is connected across the line circuit by front contacts *b* and *d* of relay AT in order to bleed off any charge stored in the line wires. During the transmission of a control code by these contacts of relay AT, the secondary winding of impulse transformer AIT is shunted by front contact *c* of master relay AM which is energized continuously during control codes. This prevents the impulses induced in the secondary winding of impulse transformer from flowing through the upper winding of line relay AR. During control codes, relay AR is operated by current pulses flowing through its lower winding as the result of the periodic operation of relay AT in a manner which has been previously explained in connection with the first form of my invention and which is also fully explained in the previously mentioned patent. This operation of relay AR drives the timing relay and the counting relay chains of the office coding unit AOLC to properly generate the code.

During indication codes received over the line circuit from the field station, as retransmitted by office location B as will be explained hereinafter, line relay AR is operated by pulses of current flowing in its upper winding from the secondary winding of transformer AIT. Since relay AT and relay AM do not operate during an indication code, the circuit for the operation of line relay AR may be traced from the right hand terminal of the secondary winding of the impulse transformer over back contacts *c* of relays AM and AT, respectively, through the upper winding of relay AR to the left hand terminal of the secondary winding. As is more fully explained elsewhere in this description, contacts *c* of relay APC and repeater relay APCP provide a shunt across the secondary winding during portions of the first and last steps of an indication code to prevent false operations of line relay AR. It is further to be noted that, during an indication code, the line battery connections are pole-changed by the operation of relay APC to close its front contacts *b* and *d*. As mentioned, a complete understanding of the full operation of the office coding apparatus at location A may be had by referring to Patent No. 2,411,375.

The apparatus and circuits as shown for office location B are also based on this previously mentioned patent, but are modified by my invention as will be described shortly in order that the general system may have two office locations to control the field stations. As described in connection with the form of my invention shown in Fig. 1, office location B in Fig. 2 is provided with a timing relay chain which is driven by the operation of line relay BR through its contact *a*. As before, this relay chain is shown in its entirety since the operation of these relays enters into the synchronizing action which is important to my invention. Office B is also provided with a counting relay chain which is shown in a somewhat conventional matter enclosed in the dot-dash box in the lower left portion of Fig. 2b designated by the reference character BOLC. This conventional box is also assumed to include the pyramid, station selection, and starting circuits for this office location. These circuits as well as most of the counting chain circuits do not enter into my invention and are thus shown conventionally, a complete description of these circuits also being included in the previously mentioned patent. Only such portions of the counting chain contacts and circuitry as are necessary to an understanding of my invention are shown. The counting chain, as is usual, is driven by contact *b* of relay BR in a manner previously described in connection with Fig. 1.

Office B is also provided with a master relay BM and a transmitter relay BT which are used when this location is transmitting control codes to the field stations. These two relays function in the usual manner, explained hereinbefore, during the transmission of control codes. Relay BT is energized and is held up or down by circuits which are identical with those previously discussed. In other words, the holding circuits originate in the station selection circuits or in the function control circuits and pass over contacts of the counting relay chain in order that the long code steps may be properly regulated as to time of occurrence in the code.

Master relay BM is energized by a circuit which generally is similar to that shown in the previously mentioned patents. However, at this office location certain other checks must be made before the master relay may be energized to allow the initiation of a control code. To this end, the energizing circuit for the master relay is checked over a back contact of a repeater relay of the master relay at office A to assure that no control code is originating at that location. It is checked over a front contact of a local control relay LC to determine that the local operator is designated as having control. It is also checked over contacts of a fault relay so that the local operator may take control in case the line circuit from the master office at A is interrupted by a fault. The energizing circuit for relay BM may thus be traced from terminal B over front contact *a* of relay LC, front contact *b* of relay 1–2CFK (both shown in Fig. 2a), wire 51, various relay contacts and circuit connections in the office coding unit BOLC, back contacts *a* of relays B1L and B2L of the timing chain, the winding of relay BM, and back contact *a* of relay AMP to terminal N. Once energized relay BM is held energized in the usual manner by a stick circuit which may be traced from terminal B at back contact *b* of counting chain relay B16, over front contacts *a*, in multiple, of timing relays BLBP and BLB, front contact *a* and the winding of relay BM, and back contact *a* of relay AMP to terminal N.

Office B is also provided with a pole-changing relay BPC and its repeater relay BPCP which function in the usual manner to pole-change the line circuit and complete other circuit connections to prepare the office to receive indication codes from the field stations. Relay BPCP, which has slow release characteristics is energized in the usual manner over front contact *e* of relay BPC. Relay BPC is energized over a circuit the equivalent of the usual arrangement. In other words, this circuit may be traced from terminal B over reverse contact *b* of line relay BR, back contacts *e* of relays BLBP and BM, respectively, back contact *c* of relay B16, the winding of relay BPC, and back contact *a* of relay AMP to terminal N. This back contact of relay AMP assures that the relay BPC cannot pick up and pole-change the line circuit during the transmission of a control code from office A. A stick circuit for this relay may be traced from terminal B at normal contact *a* of the negative line relay NR in Fig. 2a, over wire 52, front contact *d* of relay BPC, front contact *e* of relay BLBP, back contact *e* of relay BM, back contact *c* of relay B16, the winding of relay BPC, and back contact *a* of relay AMP to terminal N. As will be indicated shortly, normal contact *a* of relay NR included in this circuit assures that office A is prepared to receive the indication code. Under other conditions, this stick circuit may originate at terminal B at front contact *b* of relay LC or at terminal B at back contact *a* of the fault relay 1–2CFK to allow the indication code to proceed when office B has control or when a fault on the line circuit L1—L2 prevents retransmission of the code to office A. For purposes of synchronization, a second stick circuit for relay BPC is effective during the last step of a code to hold the line circuit pole-changed until office A has indicated that it has received a complete code. This circuit may be traced from terminal B over front contact *a* of relay BPCP, front contact *d* of relay B16, wire 53, normal contact *a* of the negative line repeater relay NPR, wire 54, the winding of relay BPC, and back contact *a* of relay AMP to terminal N. The full utilization of these stick circuits will appear hereinafter during description of the operation of this system.

Office B is provided with two line relays connected to the line circuit from office A. These relays are the positive line relay PR and the negative line relay NR. Each of these relays is a biased relay having two windings, with the upper winding, as shown, being of a relatively lower resistance than the lower winding. The ratio between the resistance of the upper and lower windings of either relay may be on the order of 100 to 400 ohms, respectively. These two line relays are normally energized over line wires L1—L2 from line battery 24 at office A. The circuit at office B may be traced from the normally positive line wire L1 through the left-hand induction coils of filter BLPF, the upper winding of relay PR in the direction of the arrow, the upper winding of relay NR in the direction opposite to the arrow, the lower winding of relay PR in the direction of the arrow, the lower winding of relay NR in the direction opposite to the arrow, and the right-hand induction coils of the filter to line wire L2. It will be seen that, under normal conditions, relay PR is so energized that its contacts are operated to their normal position, while relay NR is energized by current flowing in the direction opposite to the arrows so that its contacts remain in their biased or reverse position. It is apparent from the drawings that at times the lower windings of the two relays in series are shunted by reverse contact *a* of relay BRR.

As will appear later, this reverse contact *a* of relay BRR is used to transmit codes from office B to office A whether the codes be control or indication codes. So that this shunting of the line circuit connections at office B will make sufficient change in the line resistance to cause a relatively large increase in the current flow from the line battery at office A, the lower windings of the two line relays have considerably higher resistance than the corresponding upper windings of these relays. Thus the shunting of the lower windings appreciably reduces the overall line resistance so that the current flow increases and causes a current pulse of sufficient energy level to be induced in the secondary winding of impulse transformer AIT at office A to operate line relay AR. The utilization of this operation will appear in the description of the operation of the entire system.

It is apparent also that, when line circuit L1—L2 is pole-changed by the pickup of relay APC at office A, relay PR will operate its contacts to their reverse position due to the reversal of the current flow in its windings while relay NR will operate its contacts to their normal position since the current flow at that time will be in the direction of the arrows through the windings of the relay. Of course any interruption in the line circuit L1—L2, whether by fault or by operation of transmitter relay AT, will cause both of these biased relays to operate their contacts to their reverse position.

Relays PR and NR each are provided with a repeater relay, the relays PPR and NPR, respectively. These repeater relays are of the magnetic stick type previously defined and each has two windings. Again the lower winding of each relay is of higher resistance than the upper windings. In this case, the ratio between the resistance of the upper and lower windings is on the order of 20 ohms to 100 ohms, respectively, as an example. For each relay, the lower winding is continuously energized by being permanently connected between the terminals B and N with the current flow being in the direction opposite to the arrow as indicated. The upper winding of relay PPR is energized from the local source over normal contact *b* of relay PR. A similar circuit over normal contact *b* of relay NR is used to energize the upper winding of relay NPR. The energization of the lower winding of each relay tends to cause the relay to operate its contacts to their reverse position. However, when the upper winding is energized over the normal contact of the corresponding line relay, the higher energization of the upper winding due to the greater current flow because of the lower resistance over-rides the energization of the lower winding and causes the respective repeater relay to operate its contacts to their normal position. As long as the upper winding of either of the repeater relays is energized, the relay contacts remain in their normal position. As soon as the circuit for the upper winding is interrupted, however, the energization of the lower winding causes the contacts to be moved to their reverse position immediately.

The control codes transmitted from office A over the line circuit L1—L2 and received at office B are retransmitted to the field stations through the operation of the positive line relay PR and its repeater relay PPR. In considering a field station for this second form of my invention, reference is made to Fig. 1d which shows in abbreviated form the circuit arrangement for the line circuit connections at a field station which is typical for the system of my invention regardless of which particular form of office circuits is used. The field line relay FR shown in Fig. 1d is normally energized by line battery 25 at office B, over the half duplex communication channel between office B and the field station. This channel is again shown as being the line wires L5—L6, although other types of channels may be used as previously mentioned. At office B, the line circuit connections may be traced from the positive terminal of line battery 25 through a line resistor, the left primary winding of impulse transformer BIT, back contact *f* of relay AMP, back contact *a* of relay BT, back contact *a* of relay BPC, and the upper induction coils of another low pass line filter BLPF2 to line wire L5, with the return being from line wire L6 through the lower induction coils of the line filter, back contacts *b* of relays BPC and BT, respectively, back contact *g* of relay AMP, the right primary winding of the impulse transformer, and a second line resistor to the negative terminal of battery 25.

Relay AMP at office B is a repeater relay of master relay AM at office A and, when energized, indicates that a control code is in the process of transmission from office A. Relay AMP is energized over a circuit which may be traced from terminal B over front contact *a* of relay 1–2CFK, reverse contacts *c* of relays PR, PPR, NR, and NPR, respectively, wire 55, and the winding of relay AMP to terminal N. Once energized, relay AMP is held energized over a stick circuit which includes front contact *f* of relay BLBP and front contact *d* of relay AMP. Since, as will be later described, the coding apparatus at office B is operated in synchronism with that at office A during a control code from office A, relay BLBP remains picked up during the entire code to hold relay AMP energized. When relay AMP picks up, the opening of its back contacts *f* and *g* and the closing of corresponding front contacts transfers control of the line circuit L5—L6 to contacts *a* and *b* of relay PPR. As long as relay PPR occupies its normal position, the line circuit is energized by a circuit traced from the positive terminal of battery 25 through the first line resistor, the left-hand primary winding of impulse transformer BIT, wire 56, normal contact *a* of relay PPR, wire 57, front contact *f* of relay AMP, and thence over the circuit previously traced to line wire L5, returning from line wire L6 over a previously traced circuit to front contact *g* of relay AMP, wire 58, normal contact *b* of relay PPR, wire 59, the right primary winding of the impulse transformer, and the second line resistor to the negative terminal of the line battery. When the contacts of relay PR are released and return to their reverse positions, resulting in the operation of relay PPR to its reverse position, the energization of the line circuit is interrupted and the line circuit is shunted through the bleeder resistor 30 over reverse contacts *a* and *b* of relay PPR and wires 60 and 61.

Office location B is provided, according to my invention, with an auxiliary line relay BRR which is interposed in the line circuit connections between the actual line circuit and the office coding apparatus including the usual line relay BR. Relay BRR is a magnetic stick relay having two windings, and serves the same purpose as the similar relay shown in office location B in Fig. 1. During indication codes, this relay is energized by the pulses of current induced in the secondary winding of impulse transformer BIT as a result of the coded current flowing in the primary windings of this transformer. The circuit for this relay in this case may be traced from the right-hand terminal of the secondary winding of transformer BIT over back contacts *c* of relays BMP and AMP, respectively, and through the upper winding of relay BRR to the left-hand terminal of the secondary winding. A shunt path across the secondary winding exists at times, as will be explained later, over contacts *g* and *d* of relays BPC and BPCP, respectively. Relay BRR is also controlled by other circuits at various times in the coding action. One such circuit may be traced from terminal B over front contact g of relay BT, front contact e of relay BMP, and the lower winding of relay BRR to terminal O of the source. This particular circuit is utilized during control coding action at office location B. Another circuit arrangement may be traced from terminal O through the lower winding of relay BRR, resistor 41, and either front contact a of relay BMP or front contact e of relay AMP to terminal N. The lower winding of relay BRR is also connected, over back contact e of relay BMP, into the circuit arrangement which controls relay BR. These various circuits are utilized to control the operation of relay BRR to transmit indication codes and office B control codes to office location A, as will be more fully explained later.

Office location B is also supplied, as is usual, with a line relay BR which receives codes originating at other locations, and which is used to drive the local coding apparatus during the transmission of a control code from office B. During control codes from office A and during indication codes from the field stations, relay BR is controlled, respectively, by relays PR and BRR. When thus controlled so that it operates its contacts periodically between their normal and reverse positions, relay BR drives the timing and the counting relay chains of the coding apparatus at this location to receive the indication codes or to maintain the system in synchronism during the control codes from office A. The first of these control circuits may be traced from terminal O through the upper winding of relay BR over back contacts c of relays BT and BM, front contact h of relay AMP, which indicates that it is a control code from office A, wire 62, and thence either over reverse contact a of relay PR to terminal B or over normal contact a of relay PR, wire 63, and back contact a of relay BMP to terminal N. It is to be seen then that as relay PR is periodically operated between its reverse and normal positions by the control code being received from office A, relay BR is periodically operated between its reverse and normal positions to follow this code. The second control circuit may be likewise traced from terminal O through the upper winding of relay BR and over back contacts c of relays BT and BM, back contact h of relay AMP and thence either over reverse contact b of relay BRR to terminal B or over normal contact b of relay BRR and back contact a of relay BMP to terminal N. Thus during the receipt of an indication code from the field station, the periodic operation of relay BRR between its normal and reverse positions causes relay BR to also operate its contacts between their normal and reverse positions to drive the local coding apparatus to receive and record the indication code. It is to be noted, in each of these two above described circuits, that during an office B control code these circuits are interrupted at back contact c of relay BM which remains picked up during a locally originated control code. During such control codes, relay BR is controlled locally by circuits previously described to drive the local coding apparatus to originate the code. These circuits include the back contact b of relay AMP, the lower winding of relay BR, and either front contact f of relay BT, or back contact f of relay BT and front contact d of relay BM. Other circuits used for synchronizing purposes will be described later when the complete operation of this system is discussed.

Office B is also provided with certain other relays such as the repeater for relay BM, a fault indicating relay 1–2CFK, and a local control relay LC. The B office master relay repeater BMP is energized over an obvious circuit completed at front contact f of master relay BM so that this relay remains picked up at any time relay BM is picked up. The local control relay LC is used to complete certain circuits when the control of the field stations such as indicated in Fig. 1d is given to the operator at office B. This relay is energized over an obvious circuit completed when arm 32 of the control lever shown in Fig. 2a is moved from its remote to its local position.

It is to be understood that this relay may be controlled remotely, if so desired, to designate when the local control is to be effective, but is here shown, for simplicity, as being controlled locally by a manually operable lever.

The fault indicating relay 1–2CFK is a normally energized, slow release relay which is used to indicate when line circuit L1—L2 is interrupted by a fault for an extended period of time. This relay is normally energized over a circuit extending from terminal B over normal contact d of relay PPR and the winding of relay 1–2CFK to terminal N. During the operation of relay PPR to follow a control code from A, relay 1–2CFK is sufficiently slow releasing to bridge the period of time that normal contact d of relay PPR is open. During such a control code, when normal contact d is closed, relay 1–2CFK is energized to a higher level by a circuit extending from terminal B over front contact j of relay AMP, wire 64, normal contact d of relay PPR, and the relay winding to terminal N. It is to be also noted that a shunt circuit including the relay winding, reverse contact d of relay PPR, and reverse contact b of relay NPR acts to slightly extend the slow release time of relay 1–2CFK. A circuit for energizing this fault indication relay during an indication code may be traced from terminal B over normal contact b of relay NPR, reverse contact d of relay PPR, and the winding of relay 1–2CFK to terminal N. When any of these energizing circuits remains open for an extended period of time, that is, longer than the release time of the fault indication relay, relay 1–2CFK releases to close its back contacts. This completes certain circuits, previously described, which permit the operator at B to assume control of the operation and remote control of such field stations as are located beyond office location B. This permits control of these stations during periods of interruption of line circuit L1—L2.

I shall now discuss the general operation of the system including the circuits of my invention. First, referring again to the system in the form of my invention as shown in Fig. 1, I shall begin by assuming that a control code is to be transmitted from office location A.

The operator at office A selects the desired control and then pushes the associated start button in the usual manner of such remote control systems. In the upper left portion of Fig. 1a there is shown a control panel on which is located a control lever and a start button. It is to be understood that the system of my invention is capable of transmitting to many stations and with a variable number of controls to each station. For simplicity, I have shown a simplified control panel for one station, particularly the station shown in Fig. 1d, with the control panel consisting of a single control lever, which is assumed to control a pump located at this station, and a start button for initiating the control code. In other words, the control lever shown may be only one of several similar control levers for controlling various functions located at the station of Fig. 1d with other similar control panels located adjacent to the control panel shown. Each control panel, however, would have but one start button in the usual system. For purposes of this discussion, I shall assume that the control lever remains in the off position as shown by the heavy line because the operator desires to stop the operation of a pump located at the station of Fig. 1d.

When the operator operates the spring return start button after having selected the desired controls, a start relay, not shown, is energized and picked up. This starting relay is part of the local coding apparatus AOLC located in the conventional dot-dash box shown in the lower left portion of the drawing Fig. 1a. The start relay, once energized by the circuit completed by the push button, remains held up over a stick circuit in the usual manner of such systems. The pickup of this start relay associated with the control panel shown completes, through the various station selection and pyramid circuits of the coding apparatus, the circuits necessary to energize relays AM and AT. These energizing circuits have been previously described. Relay AM, of course, picks up first followed, upon the closing of front contact b of relay AM, by the pickup of relay AT. The closing of front contacts of relay AT completes a circuit, traced from terminal B over front contact f of relay AT and the lower winding of relay AR to terminal O, which energizes relay AR in the direction to operate its contacts to their reverse position. Each time relay AT picks up during the following control code, relay AR is energized in this manner and operates its contacts thus. Each time AT releases in the progress of the code, relay AR is energized in the opposite direction by a circuit traced from terminal O through the lower winding of relay AR, back contact f of relay AT, and front contact d of relay AM to terminal N. Thus the operation of relay AT drives the line relay AR between its normal and reverse positions. Relay AR in turn, through the periodic operation of its contacts, drives the timing and counting chain relays in a manner that has been previously described and also as is described in the reference Patent 2,411,375. This coordinated action between the transmitter relay and the line relay results in the orderly and normal progression of the code with the proper characteristics for the station and the control function selected, as described in the above mentioned patent.

This periodic coding operating of relay AT causes its repeater relay ATP to also operate in a similar manner. Relay ATP is energized by the circuit extending from terminal B over front contact b of relay AT, back contact a of relay APC, and the winding of relay ATP to terminal N. When relay AT releases to interrupt this circuit, relay ATP, being a biased relay, also releases. This periodic operation of relay ATP causes the code to be transmitted over line circuit L1—L2 by interrupting the normal supply of energy from battery 24 to line wires L1 and L2 each time its contacts a and b move to their normal position. This causes relay CC at office B to also operate its contacts in a similar periodic manner, the contacts being released to their reverse position each time the line circuit is interrupted. Each time reverse contact a of relay CC is closed, the first repeater relay CCP is energized and moves its contacts to their normal position. Closing of normal contact a of relay CCP completes the circuit for energizing the second repeater relay CCPP in the reverse direction through its lower winding, causing its contacts to be operated to their reverse position. Similarly, each time relay CC is reenergized by the closing of the line circuit, relay CCP is deenergized, releasing its contacts to cause, over reverse contact a, the energization of relay CCPP in the normal direction so that its normal contacts are then closed.

The operation of relay CCPP in following this code received from office A causes its contacts a and b to periodically open and then reclose the line circuit from office B to the field station in Fig. 1d. This causes a similar operation of line relay FR at the field station which in turn through its contacts a and b drives the field line coding and storage unit to receive the control code and record it. This causes the desired control function to be accomplished, that is, the pump located at this field station is caused to stop operation.

Meanwhile, when relay CC initially is deenergized and its contacts released to their reverse position, the circuit is completed at reverse contact d of relay CC to energize the repeater relay of the office A master relay, relay AMP at office B. This circuit is traced from terminal B over back contact b of the relay BLBPSP, front contact d of relay 1–2CFK, reverse contact d of relay CC, and of relay 1–2CFK, reverse contact d of relay CC, and the winding of relay AMP to terminal N. Relay AMP, once energized, is held energized over a stick circuit which includes front contact f of the timing relay BLBP, wire 43, and front contact d and the winding of relay AMP. This M repeater relay thus remains energized during the control code from office A. The opening of various back contacts of relay AMP interrupts circuits to prevent the initiation of a control code at office B during this period. The closing of front contact e of relay AMP locks line relay BRR in its normal position through a circuit previously traced.

Meanwhile, the periodic operation of contact c of relay CCPP between its normal and reverse positions causes the similar operation of relay BR, which in turn drives the local coding apparatus at office B to follow this control code. These circuits for controlling relay BR may be traced from terminal O through the upper winding of relay BR over back contacts c of relays BT and BM, respectively, wire 31, and reverse contact c of relay CCP and reverse contact a of relay B16P to terminal B, or normal contact c of relay CCPP, normal contact b of relay BRR, and back contact a of relay BMP to terminal N. This coding operation of the apparatus at office B keeps the unit there in synchronism with the remainder of the system and prevents it from attempting to initiate any code during this period while the control code from office A is in progress. At the completion of this control code the system returns to normal and relay AMP at office B is deenergized and releases its contacts.

I shall now assume that, in the operation of the system, the operator located at office B has been directed to assume control of the field stations located beyond his office, specifically in the present case the field station shown in Fig. 1d. The operator at B now moves the control lever arm 32, shown in the lower left of Fig. 1b, from the remote to the local position and thus energizes local control relay LC over an obvious circuit. Relay LC picks up and its front contacts a and b are closed to complete the circuits controlling master relay BM and pole-changing relay BPC. This enables the local coding apparatus to transmit control codes to the stations and to receive indication codes from the stations even through the codes are not received at office A.

It is now assumed that the operator at B desires to stop the operation of a pump located at the station in Fig. 1d. He first positions the pump control lever shown diagrammatically in the control panel in the upper left portion of Fig. 1c to its off position, shown solid in this control panel in the drawings. After positioning the control lever to its off position, the operator pushes the associated start button. It is to be assumed that this control panel shown conventionally in Fig. 1c is the equivalent of the control panel shown in Fig. 1a, that is, it is at least a portion of the control panel designated for the station of Fig. 1d. As was previously discussed in connection with Fig. 1a, this control panel as shown is only a portion of the entire control panel or facilities provided at office B. Other stations may be controlled and other controls for the station of Fig. 1d will normally also be provided, the showing here being only of the one control lever and the one associated start button in order that the drawing may be simplified.

The operation of the start button in the control panel by the operator energizes the associated start relay in the local coding apparatus. The local coding apparatus, as previously noted, is shown conventionally by the dot-dash square BOLC in the lower left of Fig. 1c, the circuits for the starting relay and the various pyramid and counting chain circuits forming no part of my invention. The start relay, having picked up, remains held up over a stick circuit not shown but described in the previously mentioned reference patents on which the present system is based. The operation of this start relay completes the circuit for energizing the local master relay BM. This circuit may be traced from terminal B at front contact a of the local control relay LC over front contact b of relay 1–2CFK, wire 33, through the various station selection and pyramid circuits of the local coding apparatus BOLC, and thence over back contacts a of timing relays B1L and B2L, respectively, the winding of relay BM, wire 34, and back contact a of relay AMP to terminal N. It is to be noted that this circuit cannot be completed, even though the start relay has been energized and picked up, unless local control relay LC is energized so that its front contact a is closed and the repeater of the master relay at A, relay AMP, is released so that its back contact a is closed. These checks assure that the conditions are correct for control coding from office B. Relay BM picks up and the closing of its front contact b energizes transmitter relay BT as has been previously described. The pickup of relay BM also completes a circuit for energizing its repeater relay BMP. This circuit is traced from the terminal B over front contact f of relay BM, wire 44, back contact a of relay BLBPSP, and the winding of relay BMP to terminal N. Relay BMP remains picked up for the entire code, being energized by a stick circuit completed when the timing chain is energized. This stick circuit includes front contact f of relay BLBP, wire 43, back contact d of relay AMP, front contact b of relay BMP, and front contact a of relay BLBPSP. This latter relay is picked up, as previously described, at the end of the energization of the timing chain relays.

When relay BT picks up, a circuit is completed over its front contact f from terminal B through the lower winding of relay BR, wire 35, and back contact b of relay AMP to terminal O to cause relay BR to operate its contacts to their reverse position. When relay BT releases periodically during the coding action, relay BR is energized through its lower winding from terminal N over front contact d of relay BM and back contact f of relay BT, and as traced previously, so that it operates its contacts to their normal position. Thus the periodic operation of relay BT drives relay BR to operate its contacts between their reverse and normal positions, respectively, which causes the coding apparatus to generate the proper code.

Relay BT is periodically picked up and released by the counting chain relays and is held picked up or held released by its stick circuits previously described to give the proper characteristics to the various code steps. These holding circuits for relay BT are completed over the various station selection relay contacts and also at the proper time over the control lever contacts as is indicated by the dotted line between the control panel and the holding circuits for relay BT, these portions of the circuits being no part of my invention and shown thus conventionally.

The initial operation of the contacts of relay BR to their reverse position energizes the timing chain relays as has been previously described and these relays pick up in sequence with relay B1L releasing during the first long step of the control code. Thereafter, relays B1L and B2L are alternately released to control the timing of the code steps. This coding action of the apparatus at office B is similar to that described in Patent 2,411,375 and again reference is made to this patent for a full description of the operation of the coding apparatus.

The actual transmission of the control code to the field station is controlled by contacts a and b of transmitter relay BT. These contacts operate periodically in accordance with the code between their front and back contacts to open and close line circuit L5—L6. This interrupts periodically the supply of energy from line battery 25 so that line relay FR at the field station in Fig. 1d is caused to alternately release the pick up. Its contacts a and b thus operate between their reverse and normal positions to drive the coding apparatus at this location which thus receives the control code, records it, and causes the proper control functions to be accomplished. In this present case, it was assumed that the pump controlled by the lever of the control panel shown in Fig. 1c was to be stopped and, as the proper positioning of the lever was accomplished prior to the sending of the code, this operation is accomplished by remote control at the field station.

It is to be noted that the circuit by which the secondary winding of impulse transformer BIT controls relay BRR is interrupted under these present conditions by the opening of back contact c of relay BMP. Further, the secondary winding is shunted by front contact c of relay BMP so that it has no effect upon relay BRR. Rather, relay BRR is controlled through its lower winding by front contact g of relay BT and front contact a of relay BMP. Each time relay BT is energized and picks up, relay BRR is energized, from terminal B over front contact g of relay BT, wire 40, and the lower winding of relay BRR to terminal O, in a direction which causes the relay contacts to move to their reverse position. The level of the energy supplied over this circuit is higher than that supplied by the circuit from terminal N over front contact a of relay BMP and resistor 41 so that relay BRR is periodically operated between its normal and reverse positions by the operation of relay BT. In other words, when relay BT picks up, the energy supplied is sufficient to cause relay BRR to operate its contacts to their reverse position. However, when relay BT releases, the circuit controlled by front contact a of relay BMP immediately supplies energy in the opposite direction through the lower winding of relay BRR to cause the relay to operate its contacts to their normal position.

This periodic operation of relay BRR to follow the control code being generated at office B causes its contact a to interrupt, in the same code pattern, line circuit L3—L4 between office B and office A. This line circuit, as previously described, is normally energized over normal contact a of relay BRR from line battery 21. When contact a moves to its reverse position, the supply of energy from the battery is interrupted and the bleeder resistor 42 is shunted across line wires L3—L4 to bleed off any static charge.

This periodic interruption of line circuit L3—L4 causes the biased line relay ARR at office A to operate to follow the code pattern, its contact a following the coded operation by moving between its reverse and normal position in an identical periodic manner. This code following operation of contact a of relay ARR causes periodic pulses of current of alternately opposite direction to flow through capacitor 20 over back contacts a of relays AM and AT and through the upper winding of the relay AR. The code following operation of relay ARR thus causes relay AR to operate its contacts in an identical code pattern. The code following operation of contacts a and b of relay AR drives the coding apparatus at office A, including the unit AOLC, to follow this control code being generated at the office location.

At office A, this control code being generated at office B appears as an indication code, since relay AM is not picked up. However, the first step of this control code is long, as is normal with control codes in this type of system, so that the long first step repeater relay 1LPP is energized. The energizing circuit, as previously described, includes back contact c of timing relay A1L, back contact a of relay ACR, and front contact a of relay A1 of the counting chain relays. The energization of relay 1LPP causes it to pick up and, although not shown in the drawings, back contacts of this relay prevent the recording of this code as an indication code. Also, back contacts a and c of relay 1LPP interrupt the auxiliary circuits for energizing relay ATP. Thus, even though relays PC and PCP pick up during this code, as during an indication code, relay ATP is not energized and therefore cannot interrupt line circuit L1—L2. This holds relay CC at the other end of line circuit L1—L2 energized so that it and its repeater relays CCP and CCPP cannot interfere with the coding operation at office B. Relay 1LPP is held energized during the remainder of the code by a stick circuit including its own front contact b and front contact d of relay ALBPS. While it is evident that relay 1LPP also picks up during an office A control code, this action has no effect on the operation since both auxiliary circuits for relay ATP here involved are also open at front contact a of relay APCP which does not pick up during such a control code.

At the completion of this control code being received at office A, the coding apparatus releases in the usual manner and at the same time as the similar apparatus at office B so that the system resets to its normal at-rest condition in synchronism.

At office B during the final step of this control code, relay B16P becomes energized over the circuit including front contact g of relay BM, front contact c of relay B16, wire 45, and the lower winding of relay B16P. However, although this relay operates its contacts to their normal position, this action has has no effect on the general operation of the coding apparatus except to open the energizing circuit for relay BLBPSP. Release of this latter relay at the end of its slow release period opens the stick circuit for relay BMP which then releases since its original energizing circuit is now open by the release of relay BM. Otherwise the resetting action of the coding apparatus at office B follows the usual pattern described in the previously mentioned reference patent. In addition, the apparatus at the field stations, as shown in Fig. 1d, also resets at the same time in the usual manner. Thus the entire system including the apparatus at office A, at office B, and at the field station or stations resets in synchronism returning the system to its normal at-rest conditions simultaneously.

I shall now describe the operation of the system when an indication code is being transmitted from the station to the office locations. When either of the control codes previously described is received at the field station shown in Fig. 1d, an indication code is initiated which is then transmitted at the completion of the control code. This indication code is produced in the usual manner by this station as already described in the previously mentioned Patent 2,411,375. Only sufficient description of the transmission of this indication code will be included to review the pertinent points necessary for an understanding of my invention. Briefly described, during each odd numbered step of the indication code, line circuit L5—L6 is shunted at the field station, while on the even numbered steps the line circuit is again completed through the windings of the field line relay FR. Initially, at the very beginning of the indication code, the line shunt is applied by the closing of front contact d of the field master relay FM. This shunt circuit may be traced from the lower left-hand terminal of code filter LPF through back contacts f of relays FCD and FLBP, respectively, and front contact d of relay FM to the lower right terminal of the code filter. It is to be noted that when relay FM is energized and picks up, the closing of its front contacts b and d pole-changes the line circuit connections of line relay FR. After the timing chain relays have picked up so that back contact f of relay FLBP is open, the shunting of the line circuit is accomplished over front contact b of the field transmitter relay FT. When the transmitter relay is picked up, its front contact b shunts the line circuit as traced from the lower left terminal of the code filter, over back contact f of relay FCD, front contact b of relay FT, and front contact d of relay FM to the lower right terminal of the code filter. When relay FT is released, the pole-changed line circuit connections are completed through the windings of relay FR from the lower right terminal of the code filter over front contact d of relay FM, back contact b of relay FT, both windings of line relay FR in series, and front contact b of relay FM to the lower left terminal of the code filter. Relay FT, as driven by the station coding apparatus, periodically picks up and releases to produce the indication code. Each time relay FT picks up, its front contact b shunts the line circuit and the current flowing in line circuit L5—L6 is increased. Correspondingly, each time relay FT releases, the shunt is removed and the line current returns to normal. At the end of the indication code, that is, at the end of the sixteenth step, relay FM is released returning the line circuit connections to their normal polarity and removing any shunt from the line circuit at this station.

Each time a shunt is applied to the line circuit at the field station and the current supplied by the line battery 25 at office B is increased, the increased current flows through the primary windings of the impulse transformer BIT. Each time this shunt is removed from the line circuit at the field station, the current flowing through these primary windings decreases to its normal value. The sudden increases and decreases of the current flowing in the primary windings of this impulse transformer induce pulses of current of alternately opposite directions in the secondary winding. These pulses flow through the upper winding of line relay BRR in a path which may be traced from the left terminal of the secondary winding through the upper winding of relay BRR and back contacts c of relays AMP and BMP, respectively, to the right-hand terminal of the secondary winding. These pulses of current flowing in the winding of relay BRR in alternately opposite directions cause the relay to operate its contacts between their reverse and normal positions, respectively. In this manner the indication code, as will be described shortly, is received at office B and is also retransmitted to office A. It is to be remembered that indication codes are received at both office locations and recorded at each one.

When relay BRR operates its contacts to their reverse position on the first step of the indication code, a circuit is completed from terminal B over reverse contact b of the relay BRR, normal contact c of relay CCPP, wire 31, back contacts c of relays BM and BT, and through the upper winding of relay BR to terminal O. Current flowing in this winding is in the direction to cause relay BR to operate its contacts to their reverse position. When contact b of relay BRR returns to its normal position, the circuit through the winding of relay BR is completed over back contact a of relay BMP to terminal N. The current flow in this circuit causes relay BR to operate to its contacts to their normal position. Thus the alternate operation of contact b of relay BRR between its reverse and normal positions causes a similar operation of relay BR so that its contacts also follow the received indication code.

During the initial step, the closing of the reverse contacts of relay BR causes the energization of the timing relay chain and the initial energization of the relays in the counting chain. Also, pole-changing relay BPC is energized by the pickup circuit previously traced which includes reverse contact b of relay BR, back contacts e of relays BT and BM, back contact a of relay B16, and back contact a of relay AMP. Relay BPC, thus energized, picks up and at its contacts a and b pole-changes the line circuit connections from office battery 25 to line wires L5—L6. This pole-changing of the line circuit connections at office B matches that action already accomplished at the field station in Fig. 1d and permits this field station to continue with the transmission of the indication code. At the same time, any other field stations connected to line circuit L5—L6 are locked out with their line relays reversed by the reverse polarity of the energy on the line circuit. Relay BPC is held energized throughout the remainder of the indication code by a stick circuit including its own front contacts c and d, normal contacts d and c, respectively, of relays CCPP and CC, and front contact e of relay BLBP, which circuit has been previously traced.

At the same time that the code following operation of contact b of relay BRR is driving line relay BR at office B, the similar operation of contact a of relay BRR is periodically opening and reclosing line circuit L3—L4 from office B to office A. This causes line relay ARR at office A to alternately release its contacts to the reverse position and, upon being reenergized, move them again to the normal position. This action is similar to that previously described when office B was transmitting a control code, which office A apparatus followed. The initial movement of contact a of relay ARR to its reverse position causes a pulse of current to flow from terminal B through capacitor 20 and over back contacts a of relays AM and AT through the upper winding of relay AR to terminal O. The direction of this pulse of current is such as to cause the contacts of relay AR to move to their reverse position, initiating the action at office A to receive the indication code. The closing of reverse contact a of relay AR energizes the timing chain relays in the manner previously described and these relays pick up in sequence. It is to be noted in this case that relay A1L does not release during the first step of the code, since the first step of an indication code is shorter than the corresponding step of a control code. Therefore, back contact c of relay A1L is not closed at the same time that front contact a of relay A1 is closed in the energizing circuit for relay 1LPP so that this relay does not pick up during an indication code. The operation of contact b of relay AR drives the counting chain relays at this location to receive the indication code and cause it to be properly recorded.

The initial operation of contact b to its reverse position completes the circuit for energizing relay APC. The circuit is traced from terminal B over reverse contact b of relay AR, back contacts e of relays ALBP and AM, back contact c of relay A16, and the winding of relay APC to terminal N. Upon picking up, relay APC completes a stick circuit for itself, which retains this relay energized during the entire indication code. This stick circuit includes front contact c of relay APC and front contact e of relay ALBP with the remainder being the same as the energizing circuit just traced. Although, because of the type of communication channels employed between office A and office B, relay APC does not pole-change any of the line circuits, its energization is required in the receipt of the indication code for proper recording and for proper resetting action at the end of the code. Relay APC energizes its repeater relay APCP upon closing of its front contact d, this relay also remaining picked up for the duration of the indication code.

This code following operation at office B and office A to receive the indication code continues in the manner just described until the final step of the code. At the beginning of the final step of the indication code, here the 16th step, the pickup of counting relay B16 interrupts, at its back contact a, the stick circuit for relay BPC at office B. However, when relay B16 closes its front contact d, a circuit is completed for energizing relay B16P, this second circuit including front contact a of relay BPCP, front contact d of relay B16, wire 46, and the upper winding of relay B16P. Relay B16P upon closing its normal contact c completes a stick circuit from terminal B at front contact d of relay BLBPS. Closing of normal contact b of relay B16P completes a second stick circuit for holding relay BPC energized during this 16th code step. This latter circuit is traced from terminal B over front contact c of relay BPC, wire 36, normal contacts d and c, respectively, of relays CCPP and CC, normal contact b of relay B16P, wire 65, the winding of relay BPC, wire 34, and back contact a of relay AMP to terminal N. This circuit holds relay BPC energized for the purpose of assuring that the indication code has also been received at office A and is interrupted when normal contact c of relay CC opens, which occurs in a manner to be explained shortly.

At office A, when relay A16 picks up on the final step of the code, a circuit is completed for energizing relay ATP. This circuit is traced from terminal B at front contact a of relay APCP over front contact a of relay A16, back contact a of relay 1LPP, back contact c of relay AT, front contact b of relay APC, and the winding of relay ATP to terminal N. Relay ATP operates its contacts to their normal position and the opening of reverse contacts a and b interrupts line circuit L1—L2, causing relay CC at office B to release its contacts to their reverse position. Also, at office A, the opening of back contact c of relay A16 interrupts the stick circuit for relay APC, which releases shortly. The opening of front contact b of relay APC deenergizes relay ATP, which being a biased relay returns its contacts to their reverse position, once again completing line circuit L1—L2 and reenergizing relay CC at office B. The apparatus at office A, upon release of relay APC and with relay AR remaining in its normal position, resets with all of the timing chain relays releasing in the usual order, relay A1L being the last to release. This resetting operation is in synchronism with the similar resetting operation at office B and incidentally with the field station at Fig. 1d.

Turning again to office B, it is to be noted that when relay CC released, closing its reverse contacts, relay CCP is energized and operates its contacts to their normal position. This causes relay CCPP to operate its contacts to their reverse position, since the lower winding of this latter relay is energized by current flowing in the direction opposite to the arrow. This operation assures that the second stick circuit for relay BPC will be open not only at normal contact c of relay CC, but also at normal contact d of relay CCPP. Sufficient time elapses before both of these contacts reclose for relay BPC to release. This second stick circuit for relay BPC thus has assured that both office B and office A have received all the steps of the indication code before either location is allowed to reset. Further, normal contact d of relay CCPP being opened during the reset pulse from office A assures that relay BPC will release at this time so that the coding apparatus at both office locations will reset together in synchronism. It is to be noted that, with reverse contact a of relay B16P being open during this final step, the circuit is not completed to operate relay BR to its reverse position during the period of time that reverse contact c of relay CCPP is closed during the reset pulse. This is necessary in order to prevent delay in the resetting of the timing chain and other apparatus at office B.

It is to be seen, therefore, that an indication code originating at a station such as that shown in Fig. 1d is received simultaneously at office B and at office A. It has also been shown that the resetting action at the two offices is synchronized so as to assure that all of the code steps of the indication code have been received at both locations and that neither can reset until the other is in a condition for a similar resetting action. Further, it is seen that the field stations including the one that transmitted the indication code are reset in synchronism with the offices.

In the foregoing description of this first form of my invention, it has been shown that, under normal conditions, either office location may control the field stations but that only one control code, from either office, can be transmitted at any one time. Also, indication codes from the field station are received at both offices and the resetting action at the end of the indication code is synchronized so that all locations reset together. I shall now describe the operation under abnormal or other unusual conditions, including the condition when two coding actions may attempt to start simultaneously.

The synchronizing of the coding action at the various locations in a system of the type herein disclosed is an important feature in any such remote control system. It is by this synchronizing action that the system prevents lost codes and false registry of controls and indications. As indicated in the general discussion of the coding action from the control offices and from the field station, it is necessary that all of the apparatus reset to its normal at-rest condition at the same time. If this does not occur, a code may start at a particular location with some of the other locations resetting. In this case, the new code would be received at the stations not completely reset as a code originating much earlier, so that actions or indications designated for certain code steps are falsely recorded. This synchronizing action of the system of my invention can best be explained, however, by describing the operation occurring under unusual conditions.

If a control code from office A is initiated simultaneously with the initiation of an indication code from a field station, for example, the one shown in Fig. 1d, the control code from office A will take preference over the indication code, as is usual in this type of system. If the indication code from the field station is in progress or at least starts soon enough so that relays A1L and A2L of the office A timing chain are energized and picked up, the opening of back contact a of either of these relays interrupts the energizing circuit for master relay AM, so that the control code cannot be initiated during the period that the indication code is being transmitted from the field station. However, if the control code is initiated, that is, the operator at office A pushes the start button prior to the energizing of relays A1L and A2L, the relay AM will be energized and will pick up to place the office apparatus in condition to transmit the code. As previously explained, the pickup of relay AM completes the energizing circuit for transmitter relay AT, which likewise picks up. At office A, the pickup of relay AT to close its front contacts completes an energizing circuit for relay ATP, this previously described circuit including front contact b of relay AT. The contacts of relay ATP are thus operated to their normal position and the opening of reverse contacts a and b of this relay open line circuit L1—L2 to release relay CC at office B. As previously described, this is followed by the energizing of relay CCP and in turn by the energizing in the reverse direction of relay CCPP. The opening of normal contacts a and b of this latter relay interrupt line circuit L5—L6. This condition will prevail until the end of the first step of the control code.

The first step of any control code is always long as compared to the first step of an indication code being relatively short. When the apparatus at field station in Fig. 1d reaches the end of the first step of the indication code so that relay FT at its front contact b removes the shunt from the line circuit, relay FR will remain with its contacts in their reverse position since there is no energy on line circuit L5—L6 to energize this relay. As fully described in Patent 2,411,375, this condition causes the energization of a code disagreement relay FCD, which picks up to interrupt various circuits in the coding apparatus, causing the equipment to return to its receiving condition to receive the control code being transmitted from office A.

At office B, the starting of a code from either office A or a field station causes the apparatus to begin to follow the code in order to keep in synchronism. Thus the release of relay CC to close its reverse contact d energizes relay AMP, which then holds up over the previously described stick circuit. Front contact c of relay AMP shunts the secondary winding of impulse transformer BIT and makes it ineffective to control relay BRR. At the same time, the closing of front contact e of relay AMP energizes relay BRR through its lower winding in the direction that causes relay to remain with its contacts in a normal position throughout this particular coding action. At the same time, relay CCPP through its normal and reverse contact c takes over the operation of relay BR and thus drives the coding apparatus at office B to follow the control code being transmitted from office A, in the manner that has been previously described. This keeps the coding apparatus at office B in synchronism with the apparatus at office A and likewise prevents office B from initiating a control code at this time. Relay BPC, which picks up on the initial step of the code as it originated at the field station, is released by the opening of back contact a of relay AMP to thus prevent the code from being recorded at office B as an indication code.

If office location B has control of the field stations such as in Fig. 1d, and an indication code is initiated simultaneously with a control code from office B, the indication code is overridden in the manner which is usual in such systems. In other words, the opening of back contacts a and b of relay BT, which is energized during the initial step of the control code, interrupts line circuit L5—L6 for the entire long first step of the control code. When the apparatus at the field station arrives at the end of the relatively short first step of the indication code, relay FR again does not return to its normal position since the line circuit is completely deenergized. This causes the disagreement relay FCD to pick up to eliminate that particular coding apparatus as a transmitter at that time. It also places the station in the receiving condition to receive the control code from office B.

If office B is in local control, it may occur that a control code of an emergency nature is initiated at office A simultaneously with the initiation of a normal control code from office B. As previously explained, initiating a control code at office A deenergizes relay CC since line circuit L1—L2 is opened at office A. This action results in the energization of relays CCP and CCPP. The closing of reverse contact d of relay CC energized relay AMP, which picks up. The opening of back contact a of relay AMP interrupts the energizing and the stick circuit for the master relay BM, which eliminates the apparatus at office B as a transmitter. The control code at office B is stored and the apparatus follows in synchronism with the control code being transmitted from office A. Unless the local control is cancelled by the completion of the control code from office A, this stored control code at office B may then be transmitted as soon as the other control code completes.

In the event that office B is in the local control condition and simultaneous codes are initiated at office A, office B, and a field station, the action will be similar to that described above with the result that the equipment at office B and at the field station will be locked out and the control code being transmitted from office A will be allowed to complete. As discussed above, the operation of relay ATP at office A interrupts line circuit L1—L2 releasing relay CC at office B. Again relay AMP is energized and picks up to deenergize relays BM and BPC at office B eliminating this station both as a transmitter of a control code and as a receiver of an indication code. The opening of normal contacts a and b of relay CCPP interrupts line circuit L5—L6 which results in the locking out of the indication code at the field station at the end of the relatively short first step of this indication code. Thus it is to be seen that a control code from either location takes preference over an indication code started simultaneously, while a control code from office A takes preference over a control code from office B if both codes are initiated simultaneously.

The immediate preceding description describes the various synchronizing actions and preference determination which may take place during normal coding action of the system. I shall now describe the synchronizing action under abnormal conditions which may be brought about by line disturbances such as lightning or any type of line interference which would falsely operate any one of the line relays to thereby cause one or more code steps to be blanked out so that the relays would fail to follow the complete code.

If the apparatus at office B fails to receive a complete indication code from a station, or if for some other reason the indication code stalls, with relay BR at the office in its reverse position, the coding apparatus will drop out under these reverse conditions. In other words, the timing chain relays at office B will be deenergized and release in order with the exception of relays B2L and BLBPS. Relay B2L remains energized over an obvious circuit completed at reverse contact a of relay BR, while relay BLBPS is held energized over its stick circuit which includes front contact c of relay B2L. When relay BLBP releases its contacts in the drop-out sequence, a circuit is completed for energizing the relays BR and BRR in the normal direction. This circuit may be traced from terminal N over back contact d of delay B1L, front contact d of relay B2L, back contact g of relay BLBP, front contact e of relay BLBPS, and thence a first path over wire 40 and through the lower winding of relay BRR to terminal O and a second path over back contact d of relay BM, back contact f of relay BT, the lower winding of relay BR, wire 35, and back contact b of relay AMP to terminal O. The closing of normal contact a of relay BR reenergizes relay B1L over front contact a of relay BLBPS. The other relays of the counting chain are also reenergized in sequence over circuits previously described. Relay B2L is deenergized by the opening of reverse contact a of relay BR, but remains with its front contacts closed due to its slow release characteristics for sufficient time that the other timing relays may be reenergized. Relay B2L then releases its contacts and deenergizes relay BLP which releases shortly. In turn, the remaining relays of the counting chain release with relay B1L being the last to release in this case.

When the contacts of relay BR move to their normal position, the opening of reverse contact b interrupts the energizing circuit for the relay BPC. The stick circuit for this latter relay was previously opened, during the reverse drop-out of the timing chain, by the release of relay BLBP to open its front contact e but the closing of its back contact e held relay BPC energized. Relay BPC, being now deenergized, releases its contact d so as to interrupt the stick circuit prior to the reenergization of relay BLBP. The release of contacts a and b of relay BPC pole-changes the line circuit L5—L6 to return it to its normal polarity. At the field stations, the line relays FR at this time are returned to their normal position, having previously been held in the reverse position by the reversed polarity of the line circuit. The timing chain at each field station is then energized with relay FR normal and immediately drops-out again with field timing relay 2L being the first to release, the others following in sequence ending with relay 1L. This drop-out on the normal side is in synchronism with the similar drop-out just described at office B so that the office and all stations reset to the normal at-rest condition in synchronism.

When relay BRR operates its contacts to their normal position, as previously described, the closing of normal contact a reenergizes line circuit L3—L4 causing relay ARR at office A to return its contacts to their normal position. Prior to this moment, the apparatus at office A had also dropped-out on the reverse side, its timing chain relays having released with the exception of relays A2L and ALBPS which are held energized in a manner similar to that previously described for the similar relays at office B. The closing of normal contact a of relay ARR energizes relay AR in its normal direction through the circuit previously traced, which includes back contacts a of relays AM and AT. Closing of normal contact a of relay AR reenergizes relay A1L over the circuit including front contact a of relay ALBPS. Relay A1L picks up, closing its front contacts. Relay A2L, although deenergized, holds its front contacts closed, because of its slow release characteristics, for a sufficient time to reenergize the rest of the timing chain relays. Release of relay A2L shortly thereafter deenergizes the timing chain relays again and they drop-out in sequence with relay A1L being the last to release in the normal procedure. The operation of relay AR to its normal position occurs at substantially the same time as the similar operation of relay BR, so that the apparatus at both office locations also resets substantially in synchronism, and likewise in synchronism with the station coding units.

If the apparatus at office A fails to receive a complete indication code, or if the code becomes stalled, so that line relay AR is held in its reverse position, then the timing chain at office A will release under these reverse conditions in sequence, but with the relays A2L and relay ALBPS remaining energized. When relay ALBP releases, the closing of its back contact f completes a circuit which causes relay AR to operate its contacts to their normal position. This circuit may be traced from terminal N over back contact d of relay A1L, front contact d of relay A2L, back contact f of relay ALBP, front contact e of relay ALBPS, the winding of relay RS, back contact d of relay AM, back contact f of relay AT, and the lower winding of relay AR to terminal O. Flow of current in this circuit is such as to cause relay AR to operate its contacts to their normal position and relay RS to hold its contacts in their normal position, which they already occupy. Closing of normal contact a of relay AR reenergizes relay A1L and through it, the remaining relays of the counting chain, as has been previously described. Relay A2L is deenergized by the opening of reverse contact a of relay AR, but because of its slow release characteristics holds its front contacts closed until the timing relays are all reenergized. The eventual release of relay A2L initiates the release of the timing chain in sequence with relay A1L being the final relay to release, thus resetting the coding apparatus at office A.

The opening of reverse contact b of relay AR deenergizes relay APC, since its stick circuit was already interrupted at front contact e of relay ALBP. Relay APC releases and, by opening its front contact d, deenergizes relay APCP. This latter relay, however, holds its front contacts closed for a short period, due to its slow release characteristics. At this time a circuit is completed for energizing relay ATP. This circuit may be traced from terminal B at front contact a of relay APCP over back contact a of relay A16, back contact c of relay 1LPP, back contact b of relay AT, back contact a of relay APC, and the winding of relay ATP to terminal N. The contacts of relay ATP are operated to their normal position at this time, and hold in this position until relay APCP releases to open its front contact a. The opening of reverse contacts a and b of relay ATP interrupts line circuit L1—L2, causing relay CC at office B to release and close its reverse contacts. This in turn energizes relay CCP and CCPP, as has been previously described, the normal contacts of the former relay being closed and the reverse contacts of the latter relay. The opening of normal contact c of relay CC and normal contact d of relay CCPP interrupts the stick circuit for relay BPC, which releases. Although this pulse from office A is of short duration, timed by the release of relay APCP, the stick circuit for relay BPC is held open for a sufficient time, due to the inclusion of normal contact d of relay CCPP, so that relay BPC will release under these conditions. Release of relay BPC pole-changes line circuit L5—L6 at its contacts a and b, so that all line relays at the stations are returned to their normal position at this time, allowing the apparatus at each field station to reset to its normal condition substantially in synchronism with the resetting of the office coding apparatus at office A.

At office B, when relay BPC releases, a circuit is completed from terminal O at back contact b of relay AMP over wire 35, the lower winding of relay BR, back contact f of relay BT, back contact d of relay BM, back contact f of relay BPC, and front contact b of relay BPCP to terminal N, which drives or holds relay BR in its normal position. The closing of reverse contact c of relay CCPP completes a circuit including back contacts c of relays BM and BT, which tends to operate relay BR to its reverse position, but the energization of the lower winding over the previously traced circuit is sufficiently greater to hold this relay in its normal position and allow the coding apparatus, particularly the timing chain at office B, to reset under this normal condition. This resetting action is synchronized with the resetting action at office A, so that the entire system returns to its normal at-rest condition at substantially the same time.

If the apparatus at office B fails to receive a complete indication code, or if an indication code stalls, in such a manner that relay BR at office B stalls in its normal position prior to the end of the code, the synchronizing action takes the form of a double drop-out operation, in order to cause all of the units to return to their at-rest condition at the same time. With relay BR stalled in its normal position with normal contacts closed, relay B1L is held energized over normal contact a of relay BR and front contact a of relay BLBPS. Relay B2L is deenergized and at the end of its slow release period opens its front contacts, thus starting the release of the entire counting chain, the relays releasing in sequence as previously described. It is to be noted that eventually relay BLBPS will also release, since both its pickup and its stick circuits will be open. However, upon the release of relay BLBP, a circuit is completed for driving relays BR and BRR to their reverse positions. This circuit may be traced from terminal B over front contact c of relay BPCP, back contact d of relay B2L, back contact g of relay BLBP, front contact e of relay BLBPS, and thence through wire 40 and the lower winding of relay BRR to terminal O and also over back contact d of relay BM, back contact f of relay BT, the lower winding of relay BR, wire 35, and back contact b of relay AMP to terminal O. It is to be seen that the direction of current flow in the lower winding of each of the two relays is in a direction to cause both relays to operate to their reverse positions. This circuit is interrupted shortly by the release of relay BLBPS to open its front contact e, but since both relays are of the magnetic stick type, their contacts remain in the reverse position. Relay BPC, energized because of the indication code, is deenergized upon the release of relay BLBP, which opens at its front contact e, the stick circuit for the relay BPC. However, reverse contact b of relay BR is closed almost immediately thereafter, so that the normal energizing circuit previously traced for relay BPC is completed and the relay is held in its picked-up position. This prevents the completion of a circuit over front contact b of relay BPCP and back contact f of relay BPC which would reset relays BR and BRR to their normal position. Also, upon the closing of reverse contact a of relay BR, the timing chain relays are reenergized in the same manner as at the beginning of any code. However, relay B1L which was deenergized when front contact a of relay BLBPS opened, is slow enough in releasing that its front contacts do not release under this situation, the relay being reenergized in sufficient time to hold it picked-up.

With relay BPC remaining picked-up, line circuit L5—L6 remains pole-changed at front contacts a and b of this relay, so that all field line relays FR remain in their reverse position, or are placed in their reverse position, so that the coding apparatus at all station locations drops out under this reverse condition, as has been previously described in connection with the previous synchronizing actions. Also, line circuit L3—L4 to office A is open at normal contact a of relay BRR, so that relay ARR at office A is deenergized and its contacts moved to their reverse position. Closing of reverse contact a of relay ARR energizes relay AR over the circuit previously traced including capacitor 20 and back contacts a of relays AM and AT. The operation of the contacts of relay AR to their reverse position causes the timing chain relays at office A to complete a reverse drop-out, as previously described, with relays A2L and ALBPS remaining energized. However, since relay APC remains picked-up at this time, due to the closing of reverse contact b of relay AR, relay ATP is not energized and line circuit L1—L2 remains closed.

At the same time that the apparatus at office A and at the field stations is dropping out under this reverse condition, that is, with the line relays in their reverse positions, so that the timing chains are released with the exception of the relays 2L and LBPS, the apparatus at office B is likewise completing a reverse drop-out under the influence of the contacts of relay BR being closed in their reverse position. In other words, the timing chain relays are released with the exception of relays B2L and BLBPS. Upon the release of relay BLBP under this reverse drop-out condition, the circuit previously traced and including back contact d of relay B1L, front contact d of relay B2L, and back contact g of relay BLBP is completed for operating relays BR and BRR to their normal position. The opening of reverse contact b of relay BR deenergizes relay BPC, which in turn releases to return the polarity of line circuit L5—L6 to its normal condition. This causes all line relays FR at the field stations to operate their contacts to their normal position, reenergizing their timing chains and then allowing them to release in the normal manner. At the same time, the closing of normal contact a of relay BR also reenergizes the timing chain relays at office B and then allows them to release in the normal manner. This resetting of line relays to normal, reenergizing of the timing chains, and normal releasing action occur substantially in synchronism. Likewise, the closing of normal contact a of relay BRR recloses line circuit L3—L4, energizing relay ARR at office A, causing it to move its contacts to their normal position. Relay AR is then energized in the normal direction over the circuit previously described including normal contact a of relay ARR. The timing chain relays at office A are thus also reenergized and then released under a normal drop-out, relay A1L being the last to release, as is usual. All of these normal releasing actions thus occur at the same time, returning the system, that is, all of the coding apparatus connected to the communication channels of the system, to a normal at-rest condition at substantially the same time, or in synchronism, so that a new code may be started with all units at-rest and in condition to receive any code.

If the coding apparatus at office A fails to receive a complete indication code or if the code stalls, so that relay AR remains in its normal position prior to completion of the normal code, the apparatus at A drops out on the normal side in a manner similar to that described for office B previously. In other words, this leaves timing chain relay A1L energized, while the remaining timing chain relays drop out beginning with relay A2L. As before, the eventual release of relay ALBPS to open its front contact a deenergizes relay A1L, but the slow release characteristics of this latter relay keep its front contacts closed until it is reenergized by the closing of the reverse contacts of relay AR, as will be described shortly. Since office A was receiving an indication code, it is to be remembered that relays APC and APCP are energized and picked up at this time, relay APC being held energized by its stick circuit, which includes front contact e of relay ALBP. When relay ALBP releases, the closing of its back contact f completes the circuit for energizing relays AR and RS to their reverse position. This circuit is traced from terminal B over front contact c of relay APCP, back contact d of relay A2L, back contact f of relay ALBP, front contact e of relay ALBPS, the winding of relay RS, back contact d of relay AM, back contact f of relay AT, and the lower winding of relay AR to terminal O. It is to be seen that the flow of current in this circuit is in the reverse direction through the relay windings which causes these relays to operate their contacts to their reverse position. The closing of reverse contacts b of relay AR reenergizes relay APC in sufficient time to prevent it from releasing its front contacts. The similar closing of reverse contact a of relay AR reenergizes the timing chain as at the beginning of any code and the timing chain relays pick up in order as has been described upon previous occasions. Although the circuit for energizing relays AR and RS is interrupted very shortly by the opening of front contact e of relay ALBPS, these relays, being of the magnetic stick type, remain with their contacts closed in the reverse position. This causes the timing chain at office A, once it is reenergized, to begin to drop out upon the reverse side, beginning with relay A1L and continuing throughout the chain. Relays A2L and ALBPS remain energized, as is usual under this type of drop-out.

The closing of reverse contact a of relay RS completes a circuit from terminal B including this contact and over back contact c of relay AT, front contact b of relay APC, and the winding of relay ATP to terminal N. Relay ATP, thus energized, operates its contacts to their normal position, opening line circuit L1—L2 at reverse contacts a and b. This deenergizes relay CC at office B causing its contacts to return to their reverse position. In turn the contacts of relay CCP operate to their normal position followed by the operation of the contacts of relay CCPP to their reverse position in the manner that has been described upon previous occasions. The closing of reverse contact c of relay CCPP causes relay BR to operate its contacts to their reverse position, the circuit including wire 31, back contacts c of relays BM and BT, and the upper winding of relay BR, as well as reverse contact a of relay B16P. Closing of reverse contact a of relay BR, as has been previously described, reenergizes the timing chain relays at that location and because this relay remains with its contacts closed in a reverse position, the timing chain drops out under these conditions, leaving relays B2L and BLBPS energized.

The opening of normal contacts a and b of relay CCPP opens line circuit L5—L6 to assure, regardless of the positions of contacts a and b of relay BPC, that all line relays at the field station will be placed in their reverse position, due to lack of energy on the line circuit, it being remembered that the field line relays are of the biased type. This causes the timing chains at the field stations to be energized and since the line relays remain in their reverse position, each timing relay chain then drops out under this reverse condition. This reverse drop-out of the timing chain and coding apparatus at all the locations, office and field stations, occurs substantially at the same time with the drop-out at office B and the field stations possibly completing slightly ahead of the similar drop-out at office A.

At this point it should be noted that relay BLBPSP at office B is provided primarily to prevent the energization of relay AMP during a resetting pulse from office A resulting from a code failure which prevents the completion of a code, particularly an indication code, at that office. As has been seen in descriptions of the two types of failure given above, line circuit L1—L2 under both cases is opened at office A by the operation of relay ATP. This causes relay CC to release closing its reverse contacts at office B. Normally, this would complete the circuit for energizing relay AMP at reverse contact d of relay CC, the circuit also including back contact b of relay BLBPSP and front contact d of relay 1-2GFK. However, once relay BLBPSP is energized during a coding action, it remains picked-up until the final step of the code, the circuit including front contact d of relay BLBPS and reverse contact c of relay B16P. However, when relay CC releases, during a reset pulse, and energizes relay CCP, the closing of normal contact b of relay CCP completes a stick circuit traced from terminal B over normal contact b of relay CCP, back contact d of relay BMP, front contact c and the winding of relay BLBPSP to terminal N. This holds relay BLBPSP energized during this resetting pulse from office A. Since this reset pulse does not occur during a regular code from office A, the alternate pickup circuit for relay AMP is open at either front contact a of relay B1 or back contact a of relay BCR. The interruption of the usual pickup circuit at back contact b of relay BLBPSP thus prevents relay AMP from being energized. During a short reset pulse the slow release time of relay BLBPSP covers the reset pulse. During these longer reset pulses, as described in this last type of synchronizing action, the stick circuit above described holds relay BLBPSP picked-up during the reset pulse.

Returning now to the synchronizing action being discussed, at the termination of the drop-out of the timing chain under the reverse condition at office A, a circuit previously described is completed for energizing relays AR and RS in the normal direction, so that normal contacts will be closed. This circuit begins at terminal N and includes back contact d of relay A1L, front contact d of relay A2L, back contact f of relay ALBP, front contact e of relay ALBPS, and windings of the two relays, as well as back contacts of relays AM and AT. The opening of reverse contact a of relay RS deenergizes relay ATP, which immediately releases to again close line circuit L1—L2. The closing of normal contact a of relay AR reenergizes the timing chain relays and these relays then drop out on the normal side, beginning with relay A2L, relay A1L being the last relay to release. This resets the apparatus at office A to its normal condition.

The closing of line circuit L1—L2 reenergizes relay CC at office B causing relay CCP to be deenergized and relay CCPP in turn to be energized in the normal direction. The closing of normal contact c of relay CCPP energizes relay BR in the normal direction through a circuit previously traced, including normal contact b of relay BRR and the upper winding of relay BR, so that the contacts of relay BR are moved to their normal position. Closing of normal contact a of relay BR reenergizes the timing chain relays, which upon completion of their pickup begin to drop out under the normal condition in the usual manner, relay B1L being the last relay to release. This drop-out occurs substantially in synchronism with the similar drop-out occurring at office A. The opening of reverse contact b of relay BR deenergizes relay BPC which releases. The release of this relay coupled with the closing of normal contacts a and b of relay CCPP reenergizes line circuit L5—L6 with normal polarity, so that the line relays at all field stations return their contacts to their normal position. The timing chain relays at each field station are thus also reenergized and then drop out under this normal condition substantially in synchronism with the drop-out at both office locations. Thus the resetting of the coding apparatus at both offices and at all the field stations occurs substantially in synchronism, the units returning to their at-rest condition, upon the release of relay 1L, approximately at the same time, so that each is simultaneously in condition to receive a new code, originating at any particular point in the system.

Other types of line or apparatus failure, or the inadvertent sending of too many station selection steps, because two stations are allowed to try to transmit at the same time, may stall the coding action or cause a breakdown in the receipt of the code. In each case, however, the resetting action is similar to one of the resetting actions just described. In some instances, however, the resetting action may be initiated at office B by the energization of transmitter relay BT to open line circuit L5—L6, causing all the stations to reset. In each case, however, the final resetting action occurs as has been just described. It is to be seen, therefore, under conditions of line failure or stalling of a code, that the resetting to the normal at-rest condition of the system, that is, of the coding apparatus at each location in the system, occurs substantially in synchronism, so that each station and each office is simultaneously ready to receive a new code, which may be originated at any location. The synchronizing of the resetting action thus prevents lost codes or the false registry of controls or indications being transmitted from any location. These synchronizing circuits in this form of my invention assure the proper operation of the system in which two control locations are provided.

I shall now describe the operation of the form of my invention shown in Fig. 2. It will be remembered that in this form of my invention the communication channel between office A and office B takes the form of a half duplex channel shown as the line circuit L1—L2. In order to simplify the drawings, no control panels and only the line circuit connections at office A are shown. This is possible since the apparatus at office A is of the usual form shown in the previously mentioned reference patent, so that it is sufficient to show the line circuit connections only for an understanding of my invention. In other words, in this form of my invention, the novelty lies in the circuit arrangement at office B with the arrangement at office A being of the type or of the nature already known in the art. It has already been mentioned that the field stations are typical of such systems and that the showing in Fig. 1d may be used with Fig. 2a and Fig. 2b to supply a complete system. The general operation of the coding apparatus shown in Fig. 2 is the same as that already described for the showing of Fig. 1 and only such repetition will be discussed as is absolutely necessary for an understanding of the circuit arrangement here shown.

I shall first describe the transmission of an office control code from office A. As previously described in connection with Fig. 1, the operator selects the position of the control lever for the particular function at field station which it is desired to control and, having completed this operation, pushes the associated start button to initiate the coding action. The transmission of the control code in his case is accomplished directly by the operation of contacts $b$ and $d$ of transmitter relay AT. For a better understanding of this phase of the operation, the relay contacts here bear the same reference characters as do the similar contacts which accomplish the similar operation in the reference Patent 2,411,375. As mentioned, this control code is generated in a manner similar to that described for the control code in this patent or to the control code already discussed in connection with Fig. 1. Briefly, the periodic operation of relay AT, as controlled by the office line coding unit, causes the line circuit to be interrupted at back contacts $b$ and $d$ of this relay, to form a code having the desired characteristics to select the proper station and, at that station, the proper function to be controlled. It will be remembered that during a control code relay APC remains deenergized, so that its back contacts $b$ and $d$ remain closed.

At office B, this control code is received by the positive line relay PR, which is periodically released and reenergized by the pulses transmitted from office A. Relay PR is repeated by its repeater relay PPR, which is normally energized over normal contact $b$ of relay PR, so that its contacts also occupy their normal position. When normal contact $b$ opens, relay PPR is energized through its lower winding by the obvious continuous circuit with the current flow being such as to cause the relay to operate its contacts to their reverse position. The initial operation of relays PR and PPR completes the circuit for energizing the office A master relay repeater AMP, this circuit being traced from terminal B at front contact $a$ of relay 1–2CFK over reverse contacts $c$ of relays PR, PPR, NR, and NPR, respectively, wire 55, and the winding of relay AMP to terminal N. Once it has picked up, relay AMP completes a stick circuit including front contact $f$ of relay BLBP, which becomes energized and remains energized during the coding action as part of the timing relay chain.

This control code is retransmitted, as it is received, to the field stations, as represented by that shown in Fig. 1d. When relay AMP picks up, its contacts $f$ and $g$ transfer control of line circuit L5—L6 to contacts $a$ and $b$ of relay PPR. Normally, these contacts $a$ and $b$ are by-passed by back contacts $f$ and $g$ of relay AMP, but the closing of front contacts $f$ and $g$ of relay AMP inserts contacts $a$ and $b$ of relay PPR into the line circuit, so that the periodic operation of these contacts between their normal and reverse positions interrupts the line circuit to form a code identical with that being received from office A. During the time that reverse contacts $a$ and $b$ are closed, line circuit L5—L6 is shunted by resistor 30 shown in Fig. 2b, in order to bleed off any static charges remaining in the line wires. It is to be noted in connection with this operation that the initial opening of the line circuit occurs at back contacts $f$ and $g$ of relay AMP, since normal contacts $a$ and $b$ of relay PPR are already open when relay AMP is energized. However, the termination of the first code step and the remainder of the complete code is controlled by the operation of these contacts $a$ and $b$.

This control code is received at the field station, as shown in Fig. 1d, by line relay FR. This control is accomplished from normally positive line wire L5 through the left induction coils of code filter LPF, over back contact $b$ of station master relay FM, through the windings of relay FR in the normal direction, over back contact $d$ of relay FM, and through the right induction coils of the code filter to the normally negative line wire L6. The resulting code following operation of contacts $a$ and $b$ of relay FR drives the local coding apparatus to receive the control code from office A. This code selects the proper station through the operation of the apparatus and, at the selected station, the function and its control as designated by the operator at A. This operation is typical at all field stations in my system in either form of the invention and is, as previously described, similar to that in the reference Patent 2,411,375.

At office B, during this control code, relay BRR is held in its normal position by a circuit over resistor 41 completed at front contact $e$ of relay AMP. In addition, the circuit from the secondary winding of impulse transformer BIT through the upper winding of relay BRR is interrupted and the secondary winding shunted at front contact $c$ of relay AMP. Meanwhile, line relay BR is controlled by the periodic operation of relay PR. The circuit for this control is completed by the closing of front contact $h$ of relay AMP. Each time relay PR is deenergized and operates its contacts to their reverse position, a circuit is completed from terminal B over reverse contact $a$ of relay PR, wire 62, front contact $h$ of relay AMP, back contacts $c$ of relays BM and BT, and the upper winding of relay BR to terminal O. When relay PR is reenergized and closes its normal contacts, the circuit for operating relay BR is traced from terminal N at back contact $a$ of relay BMP over wire 63, normal contact $a$ of relay PR, wire 62, and thence as previously traced to terminal O at the upper winding of relay BR. This code following operation of relay BR controls through its contacts $a$ and $b$, the line coding apparatus at office B. In other words, the periodic operation of contacts $a$ and $b$ of relay BR drives the timing and counting chain relays of the coding apparatus to keep this coding unit busy and synchronized with the action on the complete system. In this way, the apparatus at B is prevented from initiating a control code. It is also to be noted that the circuit for relay BPC is interrupted at back contact $a$ of relay AMP, so that this relay is not energized on the initial code step by the closing of reverse contact $b$ of relay BR and thus cannot pick up to pole-change the line circuit and interrupt the control code. Also, this prevents the code from being recorded at office B as an indication code. Upon completion of this control code from office A, all of the coding apparatus at the various locations resets in the usual way under normal conditions of the line circuit with each unit returning to its at-rest condition at substantially the same time.

I shall now describe the transmission of a control code from office B. Upon being informed that he is to assume control of the field stations beyond his location, for example the field station in Fig. 1d, the operator at office B moves arm 32 of his remote control lever (Fig. 2a) from its remote position which it occupies as shown in the drawings to the local position shown dotted. This completes the obvious circuit for energizing relay LC, which then picks up closing its front contacts. The operator then chooses the desired position of the pump control lever shown in the control panel in the upper right of Fig. 2b and pushes the associated start button. This control panel is assumed to be at least a portion of the control panel for the station shown in Fig. 1d. The momentary closing of the start button contacts energizes the corresponding start relay, which closes its contacts to energize master relay BM. This circuit for relay BM is completed from terminal B at front contact a of relay LC over front contact b of fault relay 1–2CFK, wire 51, various circuits in the line coding unit BOLC including contacts of the start relay and of the pyramid relays, back contacts a of relays B1L and B2L, the winding of relay BM, and back contact a of relay AMP to terminal N. It is to be noted that if line circuit L1—L2 is interrupted by a fault, the closing of back contact b of relay 1–2CFK will also provide energy from terminal B to this circuit for relay BM. Also, the circuit checks that no control code is being transmitted from office A by including back contact a of master relay repeater AMP in this energizing circuit. Closing of front contact f of relay BM completes an obvious circuit for energizing its repeater relay BMP, which remains energized as long as relay BM keeps its front contacts closed.

Closing of front contact b of relay BM completes the energizing circuit for transmitter relay BT which picks up to initiate the coding action by opening line circuit L5—L6 at its back contacts a and b. Closing of front contacts of relay BT also completes a circuit, traced from terminal B over front contact f of relay BT, the lower winding of relay BR, and back contact b of relay AMP to terminal O, which causes relay BR to operate its contacts to their reverse position, to complete the initial energization of the timing relay chain and also of the counting relay chain.

The control coding action continues in the manner previously described or as described in the reference patent. That is, the operation of relay BT is controlled over its stick circuits by the designated station selection and function control circuits. These circuits are completed over various contacts in the line coding unit to hold relay BT energized or to hold relay BT released to provide the proper characteristics to the code. Each time relay BT releases, relay BR is operated to its normal position by energy from terminal O at back contact b of relay AMP through the lower winding of relay BR and back contact f of relay BT to terminal N at front contact d of relay BM. In other words, the operation of relay BT drives relay BR, which in turn drives the timing and counting chains to control relay BT, so that the code as designated is properly produced. The periodic interruption of line circuit L5—L6 by contacts a and b of relay BT causes the line relays at the stations to follow this code. The code following operation of relay FR at the designated station selects that station and causes the proper control function to be accomplished as desired.

During transmission of this control code from office B to the field station, relay BRR is controlled by relay BT to transmit a similar code to office A. A circuit is completed at front contact e of relay BMP, when this relay is energized, which allows the lower winding of relay BRR to be energized in the reverse direction each time relay BT picks up to close its front contact g. This circuit overrides the circuit which causes continuous energy in the normal direction to flow through the lower winding of relay BRR over resistor 41 to terminal N at front contact a of relay BMP. At the same time, the opening of back contact c of relay BMP interrupts the circuit from the secondary winding of transformer BIT through the upper winding of relay BRR, so that the periodic interruption of the line circuit has no effect on relay BRR, the secondary winding being further shunted at front contact c of relay BMP. Relay BRR is thus controlled by front contact g of relay BT to follow the code being transmitted, the contacts of relay BRR periodically operating between their reverse and normal position to follow the characteristics of this code. It is to be noted here that the opening of back contact c of relay BM interrupts the circuit by which contact b of relay BRR normally controls relay BR.

The operation of contact a of relay BRR periodically shunts and unshunts line circuit L1—L2 to transmit this control code also to office A. This shunting circuit is traced from the lower right terminal of code filter BLPF over wire 67, reverse contact a of relay BRR, wire 68, and the upper windings, in series, of relays NR and PR to the lower left terminal of the code filter. Since the lower windings of relays PR and NR which are by-passed by this shunting circuit are of relatively high resistance, the current change in circuit L1—L2 is sufficient to cause the operation of relay AR at office A through impulse transformer AIT. In other words, each time reverse contact a of relay BRR is closed, the level of the current flowing in this line circuit is raised sufficiently to cause a pulse to be induced in the secondary winding of the impulse transformer at office A. Likewise, the lowering of the current level upon the opening of reverse contact a causes a similar pulse in the reverse direction to be induced in the secondary winding. These pulses cause the periodic operation of relay AR to follow the coding action. The periodic operation of contacts a and b of relay AR drives the coding apparatus at office A to follow this code, in order to keep this apparatus in synchronism with the remainder of the system. This manner of receiving the code at office A is similar to the receipt of an indication code over a direct current line circuit frequently used in the systems described in the previously mentioned patent. It is also similar to the receipt of an indication code at office A in the system of the present application and a more full explanation will be given shortly as to the complete operation at office A under these conditions.

Since this control code being transmitted from office B as received at office A appears as an indication code, it is necessary to prevent the recording of this code in the indication circuits at office A. To this end, a relay 1LPP, as shown in Fig. 1a, is provided to repeat the long first step of the control code, which differs from the relatively short first step of an indication code. Upon being energized, in the manner previously discussed in connection with Fig. 1, relay 1LPP opens its back contacts which, in this form of my invention, prevent the delivery of this code to the indication circuits. Thus at office A, this code produces no results, except to keep the coding apparatus in synchronism with the rest of the system. At the end of the control code from office B, the coding apparatus at each location resets to its normal at-rest condition substantially at the same time in the manner that has been previously described.

I shall now describe the transmission of an indication code from a station location such as shown in Fig. 1d and its receipt at each of the office locations. Such a code is generated at the field location in the manner that has been previously described. Initially, line circuit L5—L6 is shunted by the closing of the front contacts of master relay FM at the station, which pole-changes the line circuit connections for field line relay FR as well. Then the shunting and unshunting of the line circuit is taken over by transmitter relay FT, which periodically shunts and unshunts the line circuit as it is controlled by the coding apparatus at that station.

At office B, relay BRR is driven to its reverse position by the initial shunt on line circuit L5—L6. This action is caused by the increase in current in the primary windings of impulse transformer BIT, which produces by induction a pulse in the secondary winding. This pulse flows through the upper winding of relay BRR in a direction to cause the relay to move its contacts to their reverse position. The closing of reverse contact $b$ of relay BRR completes a circuit, previously traced, which includes back contact $h$ of relay AMP and the upper winding of relay BR to cause this latter relay to operate its contacts to their reverse position. This initial operation of relay BR, which closes its reverse contact $b$, energizes relay BPC, which picks up to pole-change the line battery connection to line circuit L5—L6. This pole-changing action is accomplished by contacts $a$ and $b$ of relay BPC, and is necessary to permit the indication code to continue, since the line circuit connections at the station transmitting the code have already been pole-changed by the energization of relay FM. The upper winding of relay BRR is shunted during this pole-changing action to prevent any pulsations of current in the secondary winding from affecting the relay. This shunt circuit may be traced from the right-hand terminal of the secondary winding of transformer BIT over front contact $g$ of relay BPC and back contact $d$ of relay BPCP to the left terminal of the secondary winding. In addition, relay BRR is held reversed by a circuit from terminal O through the lower winding over back contact $e$ of relay BMP, front contact $f$ of relay BPC, and back contact $c$ of relay BPCP to terminal B. These two last traced circuits assure that relay BRR remains in its reverse position during the initial step of the indication code. As soon as relay BPCP picks up, energized over front contact $e$ of relay BPC, the shunt circuit and the holding circuit for relay BRR are open and the relay is free to follow the pulses of current induced in the secondary winding of transformer BIT.

Relay BRR then follows the indication code being transmitted by the field station, being periodically operated between its reverse and normal positions by the coded pulses induced in the secondary winding. This operation of relay BRR drives line relay BR to follow the same code. It has already been shown that relay BR is driven to its reverse position each time reverse contact $b$ of relay BRR is closed. Correspondingly, the closing of normal contact $b$ of relay BRR completes a circuit, including back contact $a$ of relay BMP, from terminal N through the upper winding of relay BR to terminal O. The flow of current in this circuit is in the direction to operate relay BR to its normal position. In this manner, relay BR is caused to follow the code being received at office B. The resulting code following operation of contacts $a$ and $b$ of relay BR drive the timing and counting chain relays in the coding apparatus at office B to receive the indication code and record it in the proper fashion in the indication circuits.

At the same time, the code following operation of contact $a$ of relay BRR periodically shunts and unshunts the line circuit to office A, as was previously described in connection with the control code being transmitted from office B. Relay AR at office A is then controlled by these line shunts through impulse transformer AIT to follow the indication code transmitted from the field station. As was shown in Fig. 1a, the initial operation of relay AR to its reverse position completes a circuit for energizing relay APC, which picks up its contacts $b$ and $d$ to pole-change the connections to battery line circuit L1—L2. Relay AR is shunted during this pole-changing action by a circuit including front contact $c$ of relay APC and back contact $c$ of relay APCP and is also held in its reverse position by a circuit similar to that above traced for relay BRR.

This pole-changing of line circuit L1—L2 causes relay PR at office B to release, since the flow of current through the windings of this relay is now reversed and the biased relay releases its contacts to their reverse position. Opening of normal contact $b$ of relay PR deenergizes the upper winding of its repeater relay PPR and the circuit through the lower winding of this latter relay causes it to operate its contacts also to their reverse position. At this same time, the negative line relay NR is now energized in the proper direction to cause it to operate its contacts to their normal position. The closing of normal contact $b$ of relay NR energizes the upper winding of relay NPR at a sufficient level to cause this relay to operate its contacts to their normal position. The opening of reverse contacts $c$ of relays NR and NPR interrupts the energizing circuit for relay AMP to prevent operation of this latter relay at this time. Also, with relay NPR in its normal position and relay PPR in its reverse position, the fault indicating relay 1–2CFK is held energized over a circuit from terminal B at normal contact $b$ of relay NPR over reverse contact $d$ of relay PPR and the winding of relay 1–2CFK to terminal N.

The closing of normal contact $a$ of relay NR completes the stick circuit for relay BPC, this circuit also including wire 52, front contact $d$ of relay BPC, front contact $e$ of relay BLBP, which is now closed, back contact $e$ of relay BM, back contact $c$ of relay B16, and back contact $a$ of relay AMP.

It is to be noted, however, that if the control of the field station at Fig. 1d had been given to the operator at office B, so that relay LC is picked up, this stick circuit may also be completed over reverse contact $a$ of relay NR and front contact $b$ of relay LC. Also, if line circuit L1—L2 is interrupted by a fault condition, the closing of back contact $a$ of the fault indicating relay 1–2CFK will also complete this stick circuit for relay BPC over back contact $b$ of relay LC and reverse contact $a$ of relay NR.

The transmission of the indication code from the station of Fig. 1d continues with relay FT continuing to shunt and then unshunt line circuit L5—L6. Relays BR and AR follow this code, as they are driven by the operation of the various contacts of relay BRR, which is directly controlled by the transmitted indication code through impulse transformer BIT.

During the final step of this indication code, here the sixteenth step, the first stick circuit for relay BPC is opened at back contact $c$ of relay B16. However, the closing of front contact $d$ of relay B16 completes a second stick circuit for relay BPC, which may be traced from terminal B at front contact $a$ of relay BPCP over front contact $d$ of relay B16, wire 53, normal contact $a$ of relay NPR, wire 54, the winding of relay BPC, and back contact $a$ of relay AMP to terminal N. This second stick circuit is effective to hold relay BPC energized until the apparatus at office A has actually received this final step of the indication code. The energizing of relay A16 at office A, as indicated in the circuit shown in Fig. 1a, will interrupt the stick circuit for relay APC and allow it to release. This returns line circuit L1—L2 to its normal polarity by the closing of back contacts $b$ and $d$ of relay APC.

Relay NR is released by this reversal of the direction of flow of the line current. The opening of normal contact $b$ of relay NR deenergizes the upper winding of relay NPR, which then returns its contacts to their reverse position under the influence of the circuit through the lower winding of the latter relay. The opening of normal contact $a$ of relay NPR opens the second stick circuit for relay BPC and allows this relay to release. The release of contacts $a$ and $b$ of relay BPC returns the polarity of line circuit L5—L6 to normal. This allows the apparatus at the field station to reset under normal conditions, returning to its at-rest condition in the usual manner. The second stick circuit provided for relay BPC guarantees that both office A and office B have received all of the steps of the indication code, since relay BPC cannot be released until the code has been completely received at office A. If the release of relay BPC is overly delayed, due to the failure of office A to receive the final step and return line circuit L1—L2 to its normal polarity, the station line relay FR will remain released until the system can be returned to its normal at-rest condition. As described in the reference patent this delay will initiate a new code at the field station due to the failure of the start relay to be picked up and the indication code will be repeated in order to assure that it has been properly received at both office locations. If the code is completed in a normal manner at both offices, the resetting action at the offices and at the station occurs in synchronism, since this will be controlled by the R relays occupying their normal position at substantially the same time.

I shall now discuss briefly the operation under the conditions of simultaneous starting of two or more codes. If a control code from office A should be initiated simultaneously with an indication code from a field station, the following action occurs. As described in connection with Fig. 1, if the indication code has started so that relays A1L and A2L at office A have picked up, the control code will be stored as the master relay cannot be energized to initiate the control code. However, if the control code is initiated, so that the master relay is energized and in turn energizes transmitter relay AT, line circuit L1—L2 will be interrupted at back contacts b and d of relay AT. This releases relay PR at office B with the corresponding operation of relay PPR to its reverse position. As previously described, the closing of reverse contacts of these two relays energizes the master repeater relay AMP. With relay AMP picked-up, closing its front contacts f and g, and with relay PPR occupying its reverse position, so that its normal contacts a and b are open, line circuit L5—L6 is interrupted, so that when the field station reaches the end of the relatively short first step of the indication code, line relay FR will remain reversed, due to the absence of energy on the line circuit. This disagreement between the position of the line relay and the coding apparatus causes the code disagreement relay FCD to be energized, which interrupts the circuits in the coding apparatus to prevent the continuation of the coding action. This also places the station in condition for receiving the control code and the indication code will be stored until the line circuits are again free. At office B, contact c of relay AMP shunts the secondary winding of the impulse transformer and also opens the circuit through the upper winding of relay BRR, making this relay ineffective to follow the indication code. Front contact e of relay AMP is closed to operate relay BRR to its normal position, locking the relay in that condition. The code following operation of contact a of relay PR in this case drives line relay BR to cause the coding apparatus to follow the control code from office A and prevent office B from initiating a control code. In addition, the opening of back contact a of relay AMP interrupts the circuit for relay BPC and also for relay BM. With relay BPC released, this control code from office A is not received at office B as an indication code. With relay BM held released, the apparatus at office B is further prevented from initiating a control code.

If office B is in local control position and initiates a code simultaneously with the field station, the indication code will be locked out in the usual manner employed in these systems. In other words, the opening of the line circuit at back contacts a and b of transmitter relay BT causes line relay FR at the station to remain in its reverse position at the end of the first step of the indication code, which as previously described energizes the code disagreement relay FCD and locks out the indication coding.

If office A and office B simultaneously initiate control codes, the release of relays PR and PPR during the first step of the control code, because of the opening of line circuit L1—L2 at back contacts of relay AT, energizes relay AMP at office B. The opening of back contact a of this latter relay interrupts the circuit for relay BM, so that this master relay is released locking out the control code at office B. In the event that an indication code is also simultaneously initiated, so that all three locations are trying to code at the same time, the control code from office B is locked out as just described above. In addition, line circuit L5—L6 is transferred by contacts f and g of relay AMP to include contacts a and b of relay PPR. The opening of normal contacts a and b of this latter relay interrupt the line circuit as previously described, which causes the field station to become locked out, due to the disagreement between the position of its line relay FR and the coding apparatus. Thus the control code from office A would take preference over the control code from office B and the indication code from the field station. Thus it is to be seen that a control code from office A initiated simultaneously with any other code will always take preference over the other code. Likewise, a control code initiated at office B simultaneously with an indication code will take preference over the indication code, but has a lower priority than a control code initiated simultaneously at office A. As is usual in systems of this type, an indication code initiated simultaneously with a control code always has the lower priority.

In addition to the synchronizing action just described which takes place in the event of the rather normal occurrence of the initiation of simultaneous codes, this form of my invention also provides for synchronizing the coding apparatus at the various locations in the event of the occurrence of abnormal conditions, such as the interruption of codes or the misplacing of line relay contacts by foreign pulses due to effects of lighting. The action of the coding apparatus at the various locations in the event of such abnormal operation is very similar to that previously described for the form of my invention shown in Fig. 1. The differences which occur are due to the change in circuit arrangement of this second form of my invention, particularly at office B. However, in view of the preceding description of the operation of this second form of my invention, particularly in connection with the action occurring under the conditions of simultaneous starting of two or more codes, it is believed that the synchronizing actions which occur under these abnormal conditions will be obvious from a study of the circuit arrangement when taken in connection with the description of the similar synchronizing action occurring in the apparatus shown in Fig. 1. Thus this description is not repeated as it is considered to be unnecessary for a complete understanding of my invention.

In all of the preceding description, it is evident that the circuit arrangements which comprise my invention provide a remote control system in which the field stations may be effectively controlled from either of two control locations, as may be desired. At the same time, the master control location, except for the period when a control code is actually in progress from the secondary control location, is always capable of taking control of the field stations in the event of an emergency. Also, the system of my invention provides for the receiving and recording of indications from the field stations at both office locations, so that either operator may have a complete picture of the conditions of the system at all times. Also provision is made to prevent the recording of a control code from one office location at the other office location as an indication code, which would result in an incorrect indication to the operator. Simultaneous codes initiated at more than one location are automatically sorted out, so that only one code is transmitted at any time, the other codes being stored for future transmission. Also, complete synchronization of the system is provided to overcome abnormal conditions which may occur in such systems, due to external interruptions of the communication channels or the stalling of the coding apparatus due to internal trouble. The system of my invention is thus capable of providing an efficient and economical remote control system for use where more than one control location is necessary to meet the peculiar requirements of the installation to be controlled.

Although I have herein shown and described but two forms of remote control apparatus embodying my invention, it is understood that various changes and modifications may be made therein within the scope of the appended claims without departing from the spirit and scope of my invention.

Having thus described my invention, what I claim is:

1. In a remote control system, the combination comprising: a first and second control office location, at least one station location at which a controllable function is located, said office locations and said station being connected by a communication channel with said second office interposed between said first office and said station, each said office location being provided with similar coding apparatus to transmit control codes to said station to remotely control said function, said station being provided with apparatus to receive said control codes and to deliver the controls to said function, each said office coding apparatus including a master relay which must be energized for the coding apparatus to transmit a control code, energizing circuit means for said master relay being provided at each office, said second office being further provided with selective means to normally pass said control codes from said first office to said station, said selective means including a normally open contact selectively operable at times to a closed position and a repeater relay of said master relay at said first office, said repeater being energized only when said first master relay is energized, said selectively operable contact and a deenergized position contact of said repeater relay being interposed in the energizing circuit means for the second master relay to permit said second office to at times also control said function at said station when said coding apparatus at said first office is not transmitting.

2. In a remote control system, a first and a second control office location, at least one station location at which a controllable function is located, said office locations and said station being connected by a communication channel with said second office interposed between said first office and said station, each said office location being provided wtih similar coding apparatus to transmit control codes to said station to remotely control said function, said station being provided with apparatus to receive said control codes and to deliver the controls to said function, said second office being further provided with a line relay continuously energized when said first office is not transmitting and with a master repeater relay which becomes energized to indicate the transmission of a control code from said first office, said repeater relay when energized being effective to prevent the initiation of a control code by said second office coding apparatus, an energizing circuit for said repeater relay including a deenergized position contact of said line relay and a contact closed when said second office coding apparatus is at-rest, a stick circuit for said repeater relay including a contact closed when said second office coding apparatus is active, circuit means including a contact responsive to code following operation of said line relay and effective to drive said second office coding apparatus in synchronism with a control code transmitted from said first office to prevent interruption of said first office control code.

3. In a remote control system including a first and a second control office location and at least one station location at which a controllable function is located, said office locations and said station being connected by a communication channel with said second office location interposed between said first office and said station, each office being provided with similar coding apparatus to transmit control codes to said station to remotely control said function, said station being provided with apparatus to receive said control codes and to deliver the controls to said function, the combination comprising; a line relay means at said second office which is continuously energized when said first office is not transmitting a control code and which is operable by a control code from said first office, a master repeater relay which when energized indicates the transmission of a control code from said first office, said repeater relay being effective when energized to prevent the initiation of a control code by said second office, an energizing circuit for said repeater relay including a series of contacts of said line relay means all closed only when said line relay means is deenergized, a stick circuit for said repeater relay including a contact closed when the coding apparatus at said second office is active, and circuit means at said second office including a contact responsive to the code following operation of said line relay means, said circuit means being effective to drive said second office coding apparatus in synchronism with a control code from said first office.

4. In a remote control system, a first and a second control office, at least one station location at which a controllable function is located, said control offices and said station being connected by a communication channel with said second control office interposed between said first office and said station, each said control office being provided with similar coding apparatus to at times transmit control codes to said station to remotely control said function, said station being provided with apparatus to receive said control codes and to deliver the controls to said function, a first means at said second office responsive to a control code transmitted from said first office and effective to pass such control codes to said station, said first means being further effective to drive the coding apparatus at said second office in synchronism with the operation of the first office coding apparatus to prevent said second office from initiating a code to interrupt said first office control code, a second means at said second office responsive to a control code being transmitted from said second office to said station, said second means being effective to drive said first office coding apparatus in synchronism with the operation of said second office coding apparatus to prevent said first office from initiating a code to interrupt said second office control code.

5. In a remote control system including a first and a second control office and at least one station at which a controllable function is located, said offices and said station being connected by a communication channel with said second office interposed in said channel between said first office and said station, each said office and said station being provided with similar coding apparatus to at times transmit codes over said communication channel, each code from said offices being capable of controlling said function at said station, said coding apparatus at said station being capable of receiving such control codes, each code from said station being adapted to indicate at said offices the condition of said function, the coding apparatus at each office being capable of receiving such indication codes, the combination comprising; a first means at said second office responsive to a control code from said first office, said first means being effective to retransmit said first office control code to said station, said first means being further effective to drive the coding apparatus at said second office to follow said code in synchronism with the operation of said coding apparatus at said first office to prevent said second office from initiating a control code to interrupt said first office control code, a second means at said second office responsive to an indication code transmitted from said station, said second means also being responsive to a control code transmitted from said second office to said station, said second means being effective to drive said coding apparatus at said first office to follow said indication code and said second office control code in synchronism with the coding apparatus at said station or at said second office, respectively, to prevent said first office from initiating a code to interrupt said indication code or said second office control code, said indication code being received at said first office to indicate the condition of said function.

6. In a remote control system including a first and a second control office and at least one station at which a controllable function is located, said offices and said station being connected by a communication channel with said second office interposed in said channel between said first office and said station, each said office and said station being provided with similar coding apparatus to at times transmit codes over said communication channel, each code from said offices being capable of controlling said function at said station, said coding apparatus at said station being capable of receiving such control codes, each code from said station being adapted to indicate at said offices the condition of said function, the coding apparatus at each office being capable of receiving such indication codes, the combination comprising; a first means at said second office responsive to a control code from said first office, said first means being effective to retransmit said first office control code to said station, said first means being further effective to drive the coding apparatus at said second office to follow said first office control code in synchronism with the operation of said coding apparatus at said first office to prevent said second office from initiating a control code to interrupt said first office control code; a second means at said second office responsive to an indication code transmitted from said station, said second means also being responsive to a control code transmitted from said second office to said station, said second means being effective to drive said coding apparatus at said first office to follow said indication code and said second office control code in synchronism with the coding apparatus at said station or at said second office, respectively, to prevent said first office from initiating a code to interrupt said indication code or said second office control code, said indication code being received at said first office to indicate the condition of said function; a circuit means at said first office effective to cause said first office coding apparatus to transmit a pulse at the end of a received code to enable said coding apparatus at said second office and said station to reset to the at-rest condition, said circuit means including contacts closed when said coding apparatus is receiving a code and a contact closed only when an entire code has been received; and a control code repeater relay at said first office, said repeater relay being energized only during a control code from any source, deenergized position contacts of said relay being interposed in said circuit means to prevent the transmission of said reset pulse when said first office coding apparatus receives a second office control code.

7. In a remote control system including a first and a second control office and at least one station location at which a controllable function is located, said control offices and said station being connected by a communication channel with said second control office interposed between said first office and said station, each control office being provided with similar coding apparatus to at times transmit control codes to said station to remotely control said function, said station being provided with apparatus to receive said control codes and to deliver the controls to said function, the combination comprising; a first means at said second office responsive to a control code transmitted from said first office and effective to pass such control codes to said station, said first means being further effective to drive the coding apparatus at said second office in synchronism with the operation of the first office coding apparatus and to prevent said second office from initiating a code to interrupt said first office control code, said first means including a line relay means continuously energized when the first office coding apparatus is not transmitting and a master repeater relay, said line relay means having contacts which periodically move between a first position and a second position in response to a control code transmitted by said first office coding apparatus, said contacts occupying their first position when said line relay is energized, said master repeater relay being energized to indicate the transmission of a control code from said first office, a first set of contacts of said line relay means being interposed in said channel to retransmit a first office control code to said station, a deenergized position contact of said line relay means being interposed in the energizing means for said repeater relay, said repeater relay being held energized when the second office apparatus is active, a deenergized position contact of said repeater relay being interposed in the control code initiating circuit of said second office to prevent that office from initiating a control code during the transmission of a control code from said first office, a second contact of said line relay means and an energized position contact of said repeater relay being interposed in the control circuits of said second office apparatus to drive said apparatus in synchronism with said first office apparatus during a first office control code, and a second means at said second office responsive to a control code being transmitted from said second office to said station, said second means being effective to drive said first office coding apparatus in synchronism with the operation of said second office coding apparatus to prevent said first office from initiating a code to interrupt said second office control code.

8. In a remote control system including a first and a second control office and at least one station at which a controllable function is located, said offices and said station being connected by a communication channel with said second office interposed in said channel between said first office and said station, each said office and said station being provided with similar coding apparatus to at times transmit codes over said communication channel, each code from said offices being capable of controlling said function at said station, said coding apparatus at said station being capable of receiving such control codes, each code from said station being adapted to indicate at said offices the condition of said function, the coding apparatus at each office being capable of receiving such indication codes, the combination comprising; a first means at said second office to retransmit first office control codes to said station and during each first office control code to maintain the second office coding apparatus in synchronism with the first office coding apparatus to prevent the initiation of a control code at said second office, and a second means at said second office to retransmit indication codes and second office control codes to said first office to maintain the first office coding apparatus in synchronism with said second office coding apparatus; said first means including a first line relay means and a master repeater relay, said first line relay means being continuously energized when said first office is not transmitting a control code, said first line relay means having contacts responsive to a first office control code to periodically operate between a first and a second position, said contacts occupying said first position when said first line relay means is energized, a first set of said contacts being interposed in said channel to retransmit said first office control codes to said station, said master repeater relay being energized over a second position contact of said first line relay means to indicate the transmission of a control code by said first office, said repeater relay being held energized while said second office coding apparatus is active, a deenergized position contact of said repeater relay being interposed in the control code initiating circuit for said second office to prevent the initiation of a second office control code during a first office control code, a second set of contacts of said first line relay means and an energized position contact of said repeater relay being interposed in the control circuits for said second office coding apparatus to drive that coding apparatus in synchronism with said first office coding apparatus; said second means including a second line relay means having contacts periodically operable between a first and a second position in response to an indication code, said second line relay means also being responsive to a control code transmitted by said second office coding apparatus, a first contact of said second line relay means being interposed in said channel to retransmit said indication codes to said first office to drive said first office coding apparatus in synchronism with said second office apparatus to prevent the initiation of a first office control code during the transmission of said second office control codes, a second contact of said second line relay means being also interposed in said control circuits for said second office coding apparatus to drive that apparatus during indication codes.

9. In a remote control system, the combination comprising, a first and a second control office, at least one station at which a controllable function is located; each said office and said station being provided with similar coding apparatus, each office coding apparatus being capable of generating codes to control said function, said station apparatus being adapted to receive such control codes, said station apparatus further being capable of generating codes to indicate the condition of said function, each said office apparatus being adapted to receive such indication codes; a first communication channel between said first office and said second office, a second communication channel between said second office and said station, a circuit means at said first office to enable the first office coding apparatus to at times transmit control codes over said first channel; a first line relay means at said second office responsive to said first office control codes, said first relay means being effective to retransmit said first office control codes over said second channel and to drive said second office coding apparatus in synchronism with said first office control codes; a second line relay means at said second office, said line relay means being responsive to indication codes transmitted over said second channel by said station, said second line relay means being effective to drive said second office coding apparatus in synchronism with said indication codes, said second line relay means also being responsive to control codes generated by said second office coding apparatus, said second line relay means being further effective to retransmit said indication codes and said second office control codes over said first channel to drive said first office coding apparatus in synchronism with such codes; and other circuit means at said second office to enable said second office coding apparatus to at times transmit control codes over said second channel.

10. In a remote control system including a first and a second control office and at least one station at which is located a controllable function, said control offices and said station being connected by a communication channel with said second office interposed between said first office and said station, each office being provided with similar coding apparatus to transmit control codes to said station to remotely control said function and to receive indication codes from said station which indicate the condition of said function, said station being provided with coding apparatus to receive said control codes and to transmit said indication codes, each office including a master relay which must be energized for the corresponding coding apparatus to transmit a control code and a pole-changing relay which must be energized to permit the corresponding coding apparatus to receive an indication code, said station coding apparatus being able to transmit an indication code only if the second office pole-changing relay is energized, at the second office the combination comprising; a normally open contact selectively operable at times to a closed position, a line relay which continuously occupies a first position when said first office is not transmitting a control code and which alternately occupies said first position and a second position to follow a control code from said first office, a repeater relay of the first office master relay, said repeater relay being energized in response to said line relay occupying its second position if said first office master relay is energized; contacts responsive to the operation of said line relay interposed in said communication channel to retransmit said first office control codes to said station, an energizing circuit for the second office master relay including a deenergized position contact of said repeater relay and said selectively operable contact, said second office master relay energizing circuit being effective to at times permit said second office coding apparatus to transmit control codes to also control said function; and an energizing circuit for the second office pole-changing relay including deenergized position contacts of said second office master relay and said repeater relay, said energizing circuit for said second office pole-changing relay being effective to permit said station to transmit an indication code only if no control codes are being transmitted.

11. In a remote control system including a first and a second control office and at least one station at which a controllable function is located, said offices and said station being connected by a communication channel with said second office interposed in said channel between said first office and said station, each said office and said station being provided with similar coding apparatus to at times transmit and receive codes over said communication channel, each code transmitted by said offices being capable of controlling said function at said station, each code from said station being adapted to indicate at said offices the condition of said function, the combination comprising, a first means at said second office responsive to a control code from said first office, said first means being effective to retransmit said first office control code to said station, said first means being further effective to drive the coding apparatus at said second office to follow in synchronism the operation of said coding apparatus at said first office to prevent said second office from initiating a control code to interrupt said first office control code; a second means at said second office responsive to an indication code transmitted from said station, said second means also being responsive to a control code transmitted from said second office to said station, said second means being effective to drive said coding apparatus at said first office to follow said indication code and said second office control code in synchronism with the coding apparatus at said station or at said second office, respectively, to prevent said first office from initiating a code to interrupt said indication code or said second office control code; and a third means at said first office normally in a first condition and activated in response to an indication code to a second condition, said third means being restored to its first condition only upon receipt of the complete indication code, contacts responsive to the activation of said third means to its second condition being interposed in said channel and effective to activate said first means in a manner which allows said indication code to continue, said first means being held activated in said manner until said third means is restored to its first condition, the system being prevented from returning to an at-rest condition while said first means is thus activated.

12. In a remote control system, the combination comprising; a first and a second control office, at least one station at which a controllable function is located; each office and said station being provided with similar coding apparatus, each office coding apparatus being capable of generating codes to control said function and to receive codes indicating the condition of said function, said station coding apparatus being capable of receiving such control codes and generating such indication codes; a first communication channel between said first office and said second office, a second communication channel between said second office and said station, a first circuit means at said first office to permit the first office coding apparatus to at times transmit control codes over said first channel, a first line relay means at said second office having connections to said first channel and responsive to said first office control codes, contacts of said first relay means being interposed in said second channel to retransmit said first office control codes to said station, another contact of said first relay means being interposed in the control circuit of the second office coding apparatus to drive that apparatus in cynchronism with said first office control codes; a second line relay means at said second office having connections to said second channel and responsive to indication codes transmitted over said second channel by said station, a first contact of said second line relay means being interposed in said control circuit of said second office coding apparatus to drive that apparatus to receive said indication code; said second line relay also having other connections to said second office coding apparatus and responsive to control codes generated by that apparatus, a second contact of said second line relay means being interposed in said first channel to retransmit said indication codes and said second office control codes over said first channel to drive the first office coding apparatus to receive said indication codes or to drive said first office coding apparatus in synchronism with said second office control codes, respectively; a second circuit means at said second office to enable said second office coding apparatus to at times transmit control codes over said second channel to said station, and a contact at times open in response to the operation of said first line relay means, said contact being effective when open to prevent the transmission of a second office control code and an indication code.

References Cited in the file of this patent

UNITED STATES PATENTS

| | | |
|---|---|---|
| 1,575,599 | Hornberger | Oct. 1, 1940 |
| 1,755,212 | Favarger | Apr. 22, 1930 |
| 2,216,610 | Gulbertson | May 13, 1941 |
| 2,241,899 | Brown | Mar. 2, 1926 |